(12) United States Patent
Pratt et al.

(10) Patent No.: US 10,353,953 B2
(45) Date of Patent: *Jul. 16, 2019

(54) SOUND SIGNATURES IN SECURITY SYSTEMS

(71) Applicants:AT&T Intellectual Property I, L.P., Atlanta, GA (US); AT&T Mobility II LLC, Atlanta, GA (US)

(72) Inventors: James H. Pratt, Round Rock, TX (US); Steven Belz, Sunnyvale, TX (US); Michael Lattanzi, Bothell, WA (US); Constance Missimer, Seattle, WA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/028,513

(22) Filed: Jul. 6, 2018

(65) Prior Publication Data

US 2018/0314757 A1 Nov. 1, 2018

Related U.S. Application Data

(63) Continuation of application No. 15/614,655, filed on Jun. 6, 2017, now Pat. No. 10,042,925, which is a
(Continued)

(51) Int. Cl.
*G06F 16/683* (2019.01)
*H04N 5/232* (2006.01)
(Continued)

(52) U.S. Cl.
CPC ....... *G06F 16/683* (2019.01); *G08B 13/1672* (2013.01); *G08B 13/196* (2013.01);
(Continued)

(58) Field of Classification Search
None
See application file for complete search history.

(56) References Cited

U.S. PATENT DOCUMENTS 7,146,014 B2 12/2006 Hannah
8,064,290 B2 11/2011 Ding et al.
(Continued)

FOREIGN PATENT DOCUMENTS

JP 2012185129 A 9/2012
JP 2013031164 A 2/2013

OTHER PUBLICATIONS

Lisiewski et al., "Fly-ear inspired micro-sensor for sound source localization in two dimensions", JASA Express Letters, Apr. 11, 2011.
(Continued)

*Primary Examiner* — Paul W Huber
(74) *Attorney, Agent, or Firm* — Scott P. Zimmerman, PLLC

(57) ABSTRACT

Directional sound location is used to determine security events of a security system. A sound sensor reports a vector direction to a sound source of an acoustic signal. If the vector direction is historically observed at similar times, then perhaps the sound source is not considered a security event. However, if the vector direction is unknown or unfamiliar, the security system may infer the security event and notify emergency services.

20 Claims, 24 Drawing Sheets

Related U.S. Application Data continuation of application No. 14/806,701, filed on Jul. 23, 2015, now Pat. No. 9,703,864.

(51) Int. Cl.
| | |
|---|---|
| *H04N 7/18* | (2006.01) |
| *G08B 13/196* | (2006.01) |
| *G08B 13/16* | (2006.01) |
| *H04R 17/02* | (2006.01) |
| *H04R 1/32* | (2006.01) |
| *H04M 3/56* | (2006.01) |
| *G08B 25/14* | (2006.01) |

(52) U.S. Cl.
CPC ....... *G08B 13/19695* (2013.01); *H04N 5/232* (2013.01); *H04N 5/23296* (2013.01); *H04N 7/181* (2013.01); *H04N 7/183* (2013.01); *G08B 25/14* (2013.01); *H04M 3/56* (2013.01); *H04R 1/326* (2013.01); *H04R 17/02* (2013.01)

(56) References Cited

U.S. PATENT DOCUMENTS

| | | |
|---|---|---|
| 8,183,997 B1 | 5/2012 | Wong |
| 8,214,999 B2 | 7/2012 | Miles |
| 8,467,548 B2 | 6/2013 | Karunasiri et al. |
| 8,503,693 B2 | 8/2013 | Yu et al. |
| 8,611,565 B2 | 12/2013 | Currano et al. |
| 2007/0237358 A1 | 10/2007 | Tseng |
| 2011/0158417 A1 | 6/2011 | Lin |
| 2013/0141576 A1 | 6/2013 | Lord |
| 2015/0171813 A1 | 6/2015 | Ganatra |
| 2015/0198454 A1* | 7/2015 | Moore ................. H04N 13/204 701/428 |
| 2015/0221321 A1 | 8/2015 | Christian |
| 2015/0312662 A1 | 10/2015 | Kishimoto |
| 2015/0365743 A1 | 12/2015 | Konigsberg |
| 2016/0210834 A1 | 7/2016 | Dayal |

OTHER PUBLICATIONS

Liu, Haijun et al., "Understanding and mimicking the dual optimality of the fly ear." Scientific reports 3 (2013).

Lopatka, Kuba et al., "Application of Vector Sensors to Acoustic Surveillance of a Public Interior Space", Archives of Acoustics, 2011.

Ito, Akinori et al., "Detection of Abnormal Sound Using Multi-stage GMM for Surveillance Microphone", Fifth International Conference on Information Assurance and Security, 2009.

\* cited by examiner

SOUND SIGNATURES IN SECURITY SYSTEMS

CROSS-REFERENCE TO RELATED APPLICATIONS

This application is a continuation of U.S. application Ser. No. 15/614,655 filed Jun. 6, 2017 and since issued as U.S. Pat. No. 10,042,925, which is a continuation of U.S. application Ser. No. 14/806,701 filed Jul. 23, 2015 and since issued as U.S. Pat. No. 9,703,864, with both applications incorporated herein by reference in their entireties.

BACKGROUND

Security systems are common in homes and businesses. Security systems have sensors and cameras to determine security alarms. Many times, though, the security alarms are false, thus wasting the efforts of emergency personnel.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
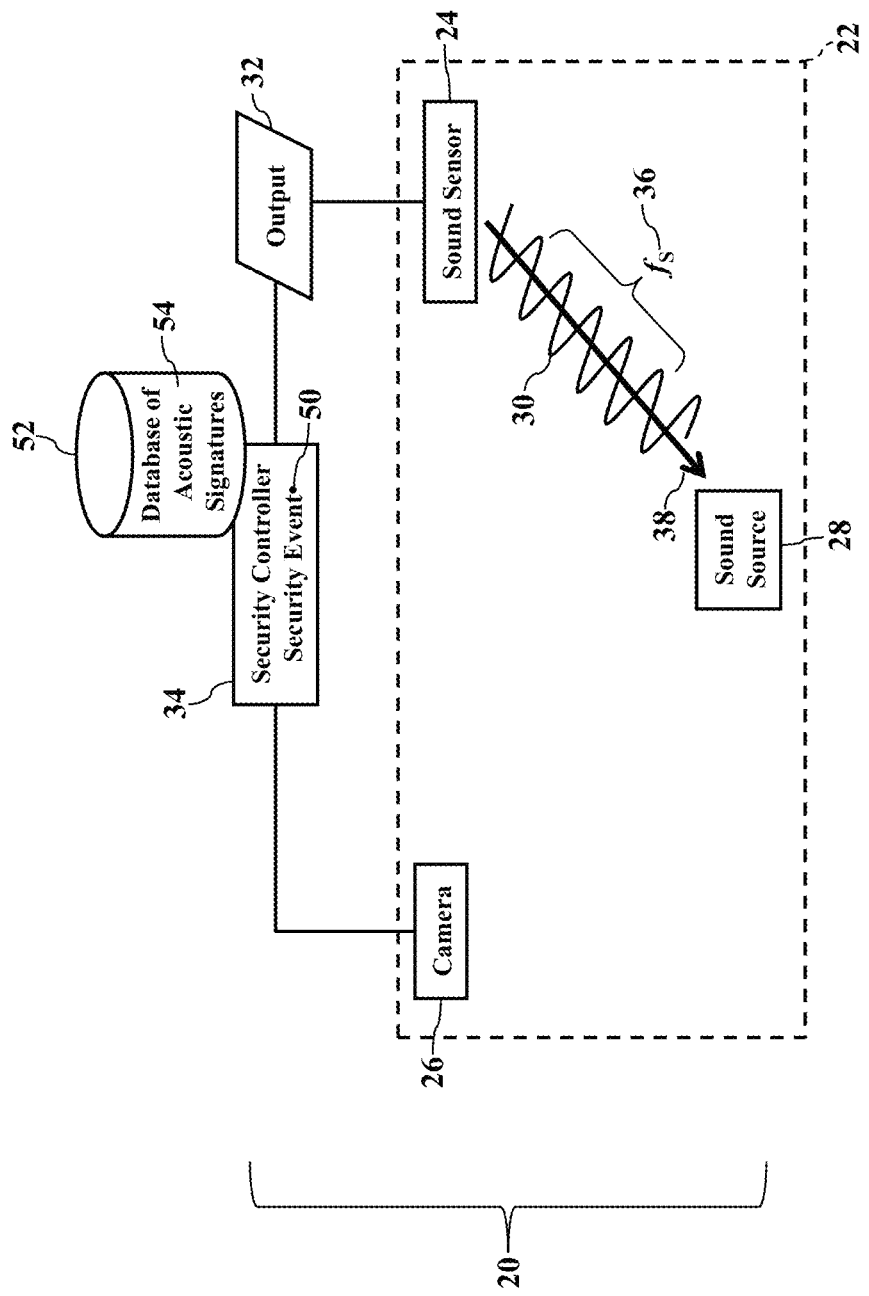
FIGS. 1-3 are simplified illustrations of an environment in which exemplary embodiments may be implemented.
Figure 2:
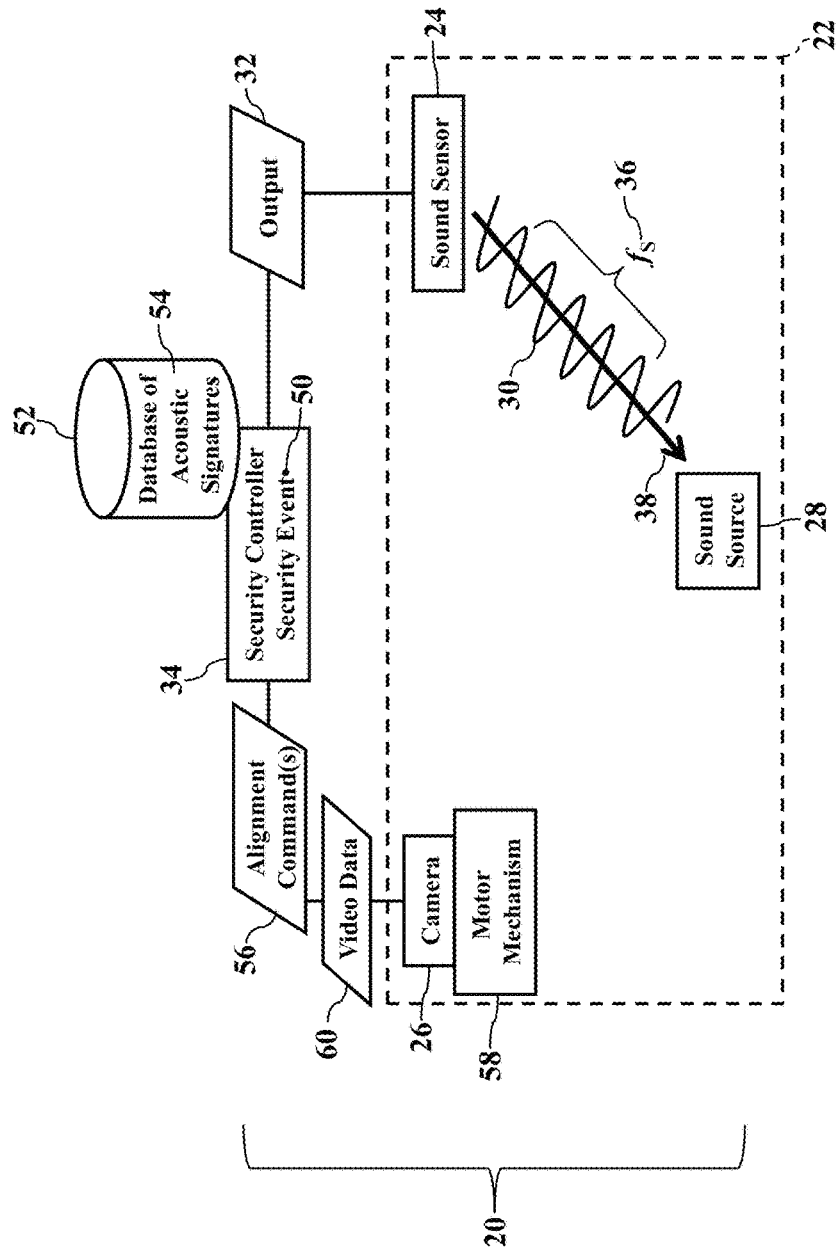
Figure 3:
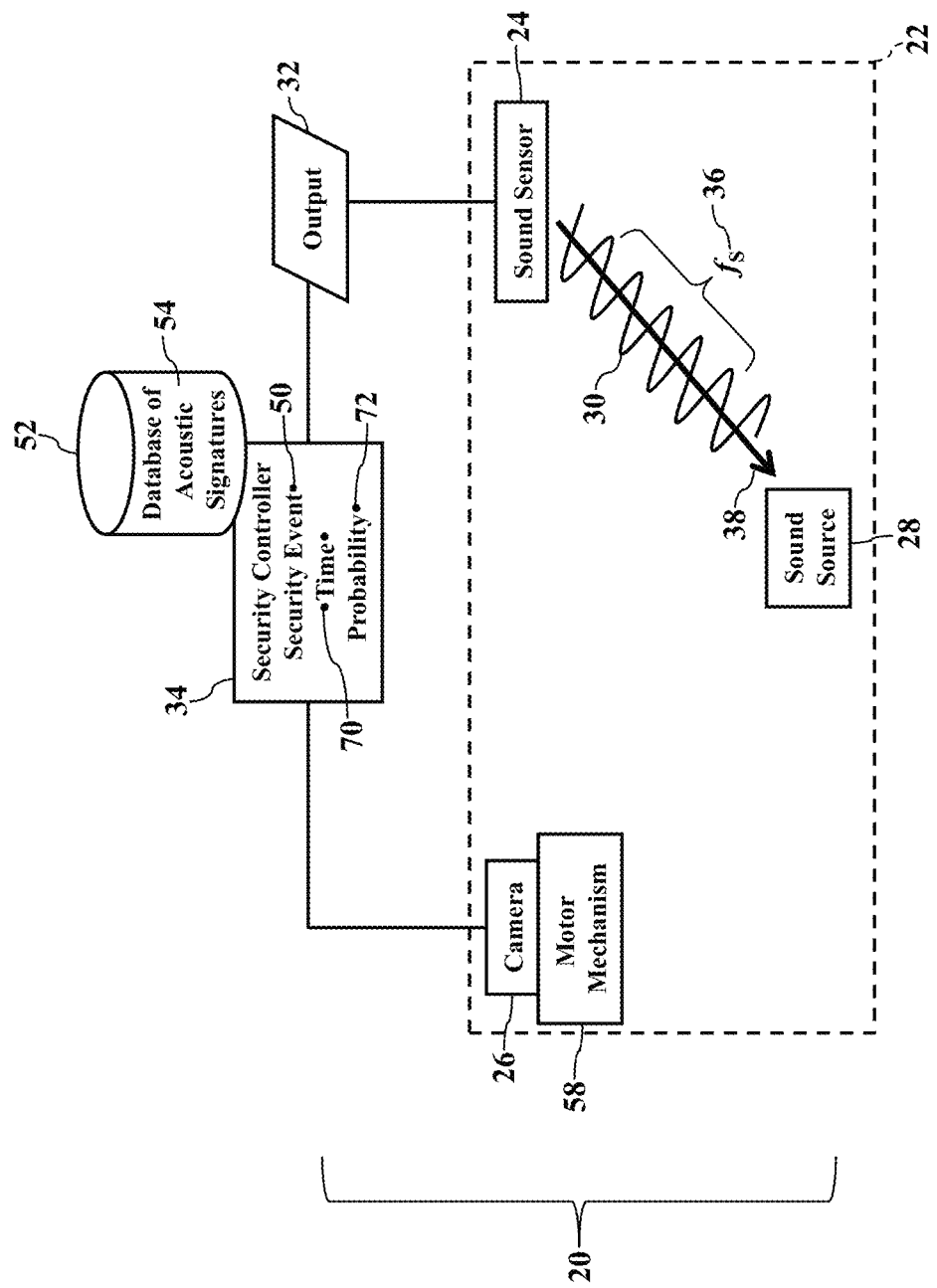

FIGS. 1-3 are simplified illustrations of an environment in which exemplary embodiments may be implemented. FIG. 1 illustrates a security system 20 monitoring an environment, such as a room 22 in a home or business. As the reader likely understands, the security system 20 uses sensors to detect security events. FIG. 1, for example, illustrates a sound sensor 24 and a video camera 26. When any sound source 28 emits or produces an acoustic signal 30, the sound sensor 24 generates one or more outputs 32. The acoustic signal 30 propagates as a sound pressure wave, which excites the sound sensor 24 (as will be later explained). The sound sensor 24 generates the outputs 32, which are sent or conveyed to a security controller 34. The outputs 32 may represent or indicate a frequency fs (illustrated as reference numeral 36) of the stimulus acoustic signal 30 and a vector direction 38 of the acoustic signal 30.

The security controller 34 may then determine a security event 50. Now that the security controller 34 knows or infers the frequency 36 and the vector direction 38 of the acoustic signal 30, the security controller 34 may consult a database 52 of acoustic signatures. The database 52 of acoustic signatures stores sounds that are known within the monitored environment. That is, exemplary embodiments store sounds that are expected, routine, or common. For example, the database 52 of acoustic signatures may store parameters 54 describing the sounds of an opening and closing refrigerator door. If the frequency 36 and/or the vector direction 38 of the stimulus acoustic signal 30 resembles or matches the frequency 36 and/or the vector direction 38 associated with closing of the refrigerator door, then perhaps no security event 50 is determined, according to embodiments. However, if the frequency 36 and/or the vector direction 38 of the stimulus acoustic signal 30 is not matched to an entry in the database 52 of acoustic signatures, then perhaps the security controller 34 generates or determines the security event 50, according to embodiments.

FIG. 2 illustrates video confirmation. When the frequency 36 and/or the vector direction 38 of the stimulus acoustic signal 30 fail to match one or more entries in the database 52 of acoustic signatures, the security controller 34 may aim the video camera 26. That is, the security controller 34 may generate and send one or more alignment commands 56 that instruct the video camera 26 to aim its lens to the sound source 28, using the vector direction 38 (as later paragraphs will explain). The video camera 26 may thus have a motor mechanism 58 that aims the video camera 26 toward the sound source 28 of the stimulus acoustic signal 30. The video camera 26 thus captures video data 60 in the vector direction 38 of the stimulus acoustic signal 30. The video data 60 may then be routed to some destination for analysis, as is generally known. If the security event 50 is confirmed, emergency services may be summoned, as is also generally known.

Exemplary embodiments may thus ignore safe sounds. Any frequencies 36 and/or vector directions 38 associated with known sounds may be ignored as non-events. For example, exemplary embodiments may ignore pet sounds from the vector direction 38 of a litter box or food bowl. Familiar sounds associated with food preparation in the kitchen may be ignored. Sounds of cabinet doors may also be ignored. Sounds associated with a dishwasher, furnace, air conditioner, water heater, and other appliances may also be ignored. The database 52 of acoustic signatures may thus store the frequencies 36 and/or vector directions 38 associated with common sounds that are not concerning.

Exemplary embodiments may also conserve electrical power. Motorized alignment of the video camera 26 can require significant electrical power, especially when battery operated. Frequent movement of the video camera 26 may thus consume direct current power, which may deplete the battery. Exemplary embodiments, instead, may only aim the video camera 26 when the security event 50 is probable. For example, the security controller 34 may only command the video camera 26 when the frequency 36 and/or the vector direction 38 of the stimulus acoustic signal 30 fail to match the database 52 of acoustic signatures. Known acoustic signatures thus need not consume direct current power from the battery.

FIG. 3 illustrates historical analysis of sounds. Here exemplary embodiments may infer safe sounds, based on historical detection. When the source 28 emits or produces the acoustic signal 30, here the security controller 34 may also utilize a time 70 associated with the acoustic signal 30. The sound sensor 24, for example, may tag or associate the frequency 36 and the vector direction 38 of the stimulus acoustic signal 30 with the time 70. The security controller 34 may additionally or alternatively tag or associate the frequency 36 and the vector direction 38 of the stimulus acoustic signal 30 with the time 70. Regardless, the time 70 may further be used to discern safe sounds from the security event 50.

The time 70 may be used to infer habitual sounds. As the reader likely understands, many sounds are repetitive, perhaps even according to the time 70 of day. Most people are creatures of habit, as we have a daily routine. The time 70 associated with the acoustic signal 30 may thus be used to further distinguish common sounds from the security event 50. The database 52 of acoustic signatures may thus also store historical observances of sounds. There may be hundreds, perhaps even thousands, of sounds detected by the sound sensor 24 throughout a day. The database 52 of acoustic signatures may thus store entries for historical observances of sounds at different times of days. Over time, then, patterns may develop at which the stimulus acoustic signal 30 (e.g., the frequency 36 and the vector direction 38) is repeatedly observed at the same, or nearly the same, time 70. This habitual observance may thus be used to ignore a current or future observance at the same, or nearly the same, time 70. For example, if the frequency 36, the vector direction 38, and/or the time 70 match an entry in the database 52 of acoustic signatures (perhaps within a window of time), exemplary embodiments may infer that the acoustic signal 30 is non-threatening, based on past observance.

FIG. 3 also illustrates a probability 72. As the database 52 of acoustic signatures grows with historical information, patterns of repeating entries may likely develop. Each entry may thus be associated with a probability 72. That is, the frequency 36, the vector direction 38, and/or the time 70 may be associated with the probability 72. For example, if the sound of the front door is detected each weekday at 3:30 p.m., the probability 72 may be nearly one (1 or 100%) at the similar time 70 of weekday. In other words, there is a very high probability 72 of a safe, non-security event. However, if the sound sensor 24 detects the front door at 3:30 a.m., the probability 72 may be very low, as historically observed. Exemplary embodiments may thus infer the security event 50, based on the low probability 72.

An example helps explain habitual usage. As most people have a daily routine, exemplary embodiments may discern habitual sounds from the unusual security event 50. For example, over time the security controller 34 will learn what sounds to expect during what hours. Weekday mornings, for example, may be filled with different frequencies 36 of sounds from different vector directions 38, representing the many activities of a family preparing for work and school. The security controller 34 may thus disregard the sounds of an opening/closing door, microwave oven, foot traffic, and voices. During work and school hours, though, the home may be empty or sparsely occupied. The security controller 34 may thus be more discerning of sounds when the room 22 is assumed empty. In other words, when the monitoring area is likely populated (as determined from habitual observance), the security controller 34 may ignore or disregard many sounds. However, when the monitoring area is assumed empty or sparsely populated, the security controller 34 may notify of any sound. Exemplary embodiments may thus adapt to, and learn from, our daily routines.

Another example helps explain habitual usage. Suppose the sound sensor 24 is located in a garage. The sound sensor 24 will detect operation of a garage door, engine and exhaust sounds from a vehicle, and movement of people. Over time the security controller 34 will learn to disregard these sounds as safe events during habitual times, such as weekday mornings and evenings. However, the security controller 34 may be more acutely aware of sounds during daytime and nighttime hours, when activity is not expected. Indeed, the sound of the garage door, without the sound of the vehicle, may be suspicious activity worthy of the security event 50. The security controller 34 may thus command the video camera 26 to capture the live video data 60 of uncommon sounds, along with even common sounds at irregular, unexpected times.

The video camera 26 may once again provide confirmation. When the frequency 36, the vector direction 38, and/or the time 70 fail to match one or more entries in the database 52 of acoustic signatures, the security controller 34 may aim the video camera 26. Likewise, if the probability 72 indicates an uncommon occurrence (perhaps compared to some threshold value), the security controller 34 may aim the video camera 26. The security controller 34 sends the alignment command 56 that instructs the motor mechanism 58 to aim the camera 26 to the sound source 28, using the vector direction 38. The video camera 26 thus captures the video data 60 for analysis. If the video data 60 confirms the security event 50, emergency services may be summoned, as is also generally known.

Conventional security systems lack an ability to discern routine, normal events from suspicious activity. That is, conventional security systems, when armed or activated, generate alarms anytime motion is observed or a contact switched is opened. However, a high percentage of these alarms are "false," even incurring fees from local police or other emergency services provider. Exemplary embodiments, instead, intelligently distinguish routine activity from abnormal behavior. As exemplary embodiments gain historical experience, exemplary embodiments discern habitual usage, thus perhaps notifying only activities that differ from historical observance. Accordingly, false alarms are thus reduced.

The probability 72 further conserves electrical power. As this disclosure above explained, motorized alignment of the video camera 26 may quickly deplete a DC battery. However, if the frequency 36, the vector direction 38, and/or the time 70 are historically observed with sufficient probability 72 (as compared to the database 52 of acoustic signatures), exemplary embodiments may infer that the acoustic signal 30 is non-threatening and safe. The security controller 34 may thus decline to aim the video camera 26 to conserve direct current battery power. Historically observed acoustic signatures thus need not consume electrical power from the battery.

FIGS. 4-8 are more detailed illustrations of the operating environment, according to exemplary embodiments. The sound sensor 24 has a network interface for communicating with the security controller 34 via a communications network 80. The sound sensor 24 has a processor 90 (e.g., "µP"), application specific integrated circuit (ASIC), or other component that executes a sensory algorithm 92 stored in a memory 94. The sensory algorithm 92 instructs the processor 90 to perform operations, such as determining the frequency 36, the vector direction 38, and/or the time 70 associated with the stimulus acoustic signal (illustrated as reference numeral 30 in FIGS. 1-3). When the sound sensor 24 has wireless capabilities, the sound sensor 24 may also include a transceiver 96 for wirelessly communicating via the communications network 80 with the security controller 34. The sound sensor 24 may further include a battery 98 for direct current electrical operation.

Figure 4:
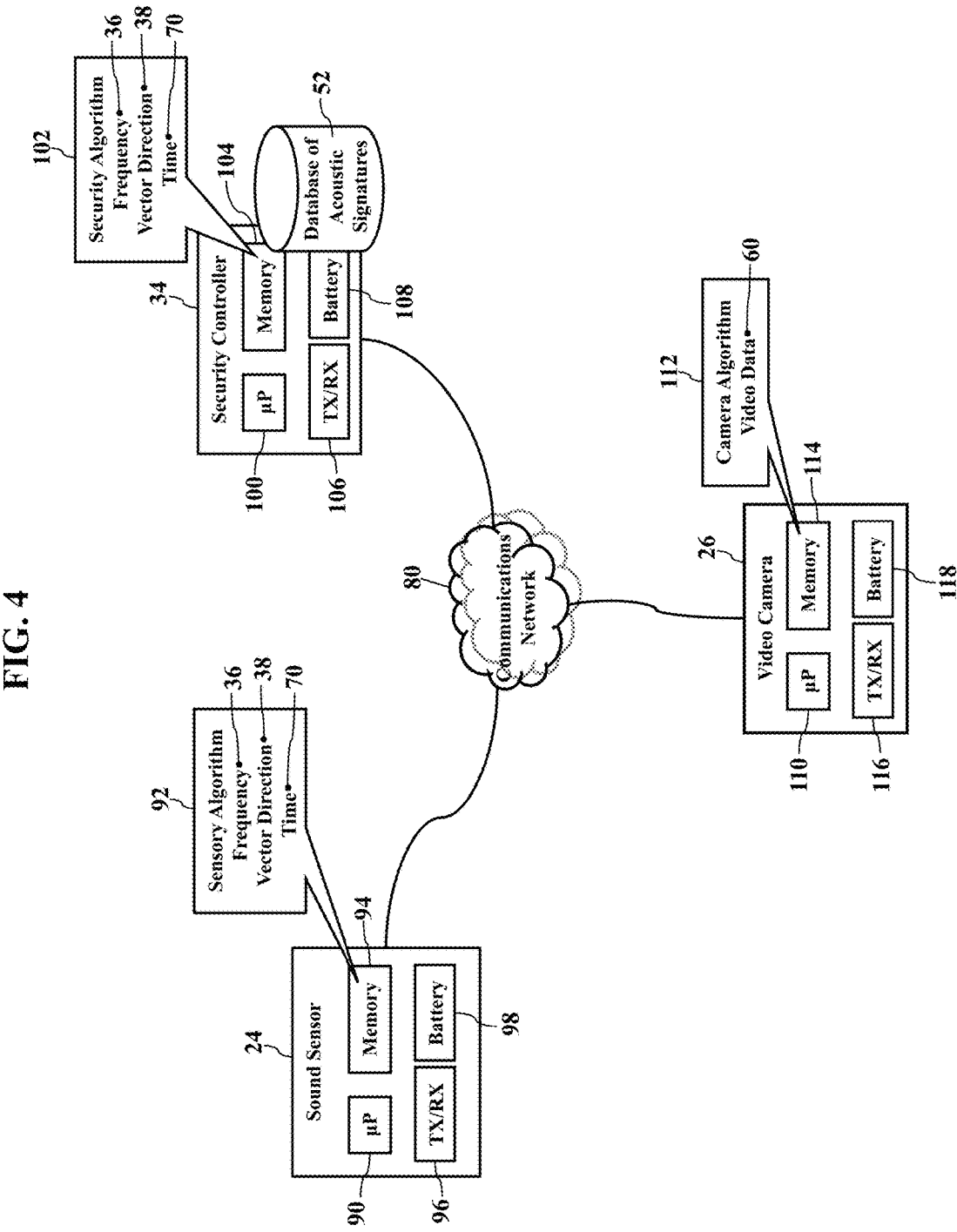
FIGS. 4-8 are more detailed illustrations of the operating environment, according to exemplary embodiments.

FIG. 4 also illustrates the security controller 34. The security controller 34 has a processor 100 (e.g., "µP"), application specific integrated circuit (ASIC), or other component that executes a security algorithm 102 stored in a local memory 104. The security algorithm 102 instructs the processor 100 to perform operations, such as receiving and processing information received from a network interface to the communications network 80. For example, the security algorithm 102 instructs the processor 100 to receive the frequency 36, the vector direction 38, and/or the time 70 sent by the sound sensor 24. The security algorithm 102 may also instruct the processor 100 to query the database 52 of acoustic signatures for a query response, such as any entries matching the frequency 36, the vector direction 38, and/or the time 70. FIG. 4 illustrates the database 52 of acoustic signatures locally stored in the memory 104 of the security controller 34. However, the database 52 of acoustic signatures may be remotely located at some other networked server or device. When the security controller 34 has wireless capabilities, the sound sensor 24 may also include a transceiver 106 for wirelessly communicating via the communications network 80 with the sound sensor 24. The sound sensor 24 may further include a backup battery 108 for direct current electrical operation.

FIG. 4 also illustrates the video camera 26. The video camera 26 also communicates with the security controller 34 via the communications network 80. The video camera 26 may also communicate with the sound sensor 24 via the communications network 80. The video camera 26 has a processor 110 (e.g., "µP"), application specific integrated circuit (ASIC), or other component that executes a video algorithm 112 stored in a local memory 114. The video algorithm 112 instructs the processor 110 to perform operations, such as generating and sending the digital video data 60 to any network destination (such as the security controller 34). When the video camera 26 has wireless capabilities, the video camera 26 may also include a transceiver 116 for wirelessly communicating via the communications network 80 with the security controller 34 and/or the sound sensor 24. The video camera 26 may further include a backup battery 118 for direct current electrical operation.

Information may be packetized. Any information sent or received via the communications network 80 may be formatted as packets of data according to a packet protocol (such as any of the Internet Protocols). The packets of data contain bits or bytes of data describing the contents, or payload, of a message. A header of each packet of data may contain routing information identifying an origination address and/or a destination address. The packets of data may thus be sent, received, and/or routed using network addresses associated with servers and devices.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to any devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 5:
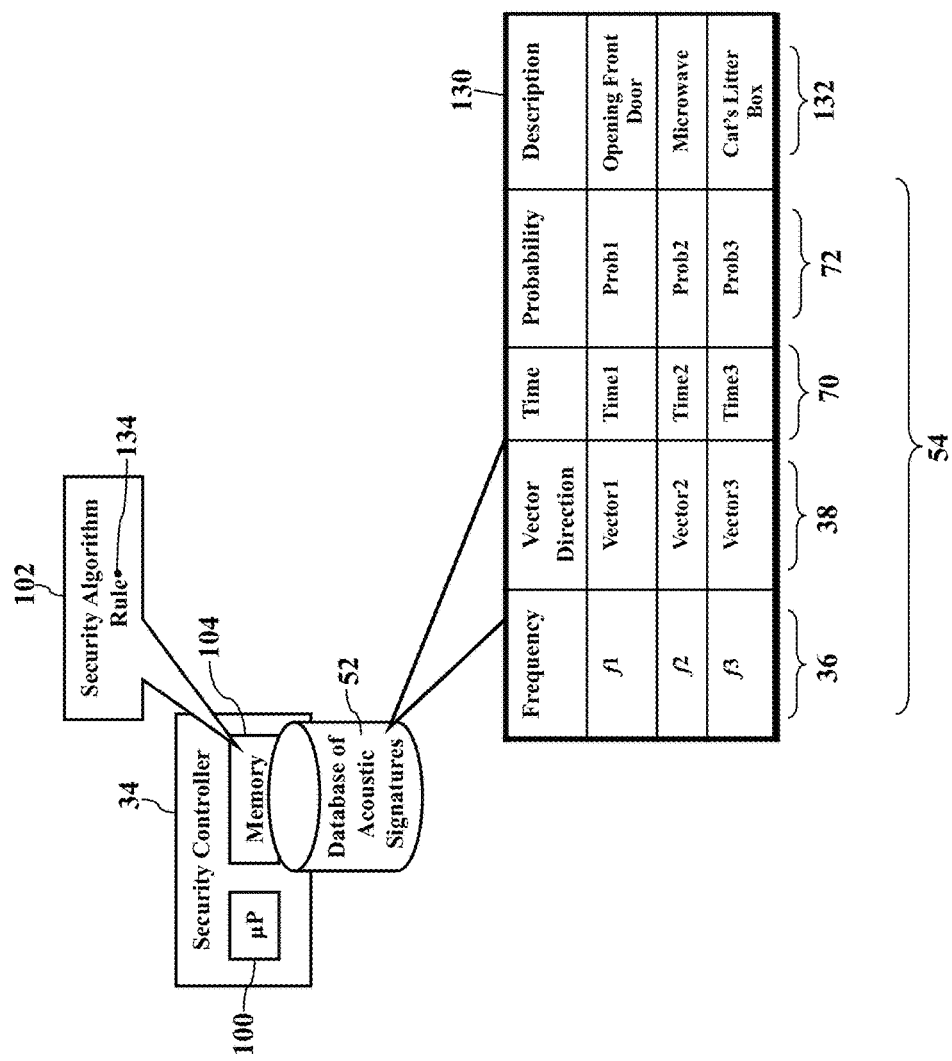

FIG. 5 further illustrates the database 52 of acoustic signatures. The database 52 of acoustic signatures maintains entries of "safe" sounds emitted by people, pets, appliances, and other sources within the acoustic monitoring range of the sound sensor 24. For simplicity the database 52 of acoustic signatures is illustrated as a table 130 that electronically maps, relates, or associates different frequencies 36, vector directions 38, times 70, and/or probabilities 72 historically observed within the monitoring environment. While FIG. 5 only illustrates a few row/column entries, in practice the database 52 of acoustic signatures may contain many entries for hundreds or thousands of sounds historically logged within the monitoring environment.

Each electronic database entry may also have a corresponding textual description 132. While the textual description 132 is not necessary, the textual description 132 is especially helpful for human users and human analysis. As each different acoustic sound is learned, the textual description 132 lends an easy explanation of the acoustic sound. For example, when exemplary embodiments detect the sound of the front door, the textual description 132 may be logged along with the corresponding time 70. A human user may thus view a report and easily read an explanation of the detected sound without having to consult cumbersome codes or interpretations. Indeed, the textual description 132 may be reported in a text message, electronic mail, or other electronic notification message, as later paragraphs will explain.

A query response is determined. The security algorithm 102 may retrieve and execute one or more rules 134 that define the security event 50. For example, the rule 134 may merely require querying the database 52 of acoustic signatures for the frequency 36, the vector direction 38, and/or the time 70 (received from the sound sensor 24, as FIGS. 1-4 illustrated). If a matching entry is found, the rule 134 may cause the processor 100 to infer or conclude that the frequency 36, the vector direction 38, and/or the time 70 are historically observed and safe. That is, the frequency 36, the vector direction 38, and/or the time 70 have been logged in the database 52 of acoustic signatures. The acoustic signal 30 is thus expected and perhaps routine and of no security concern.

Figure 6:
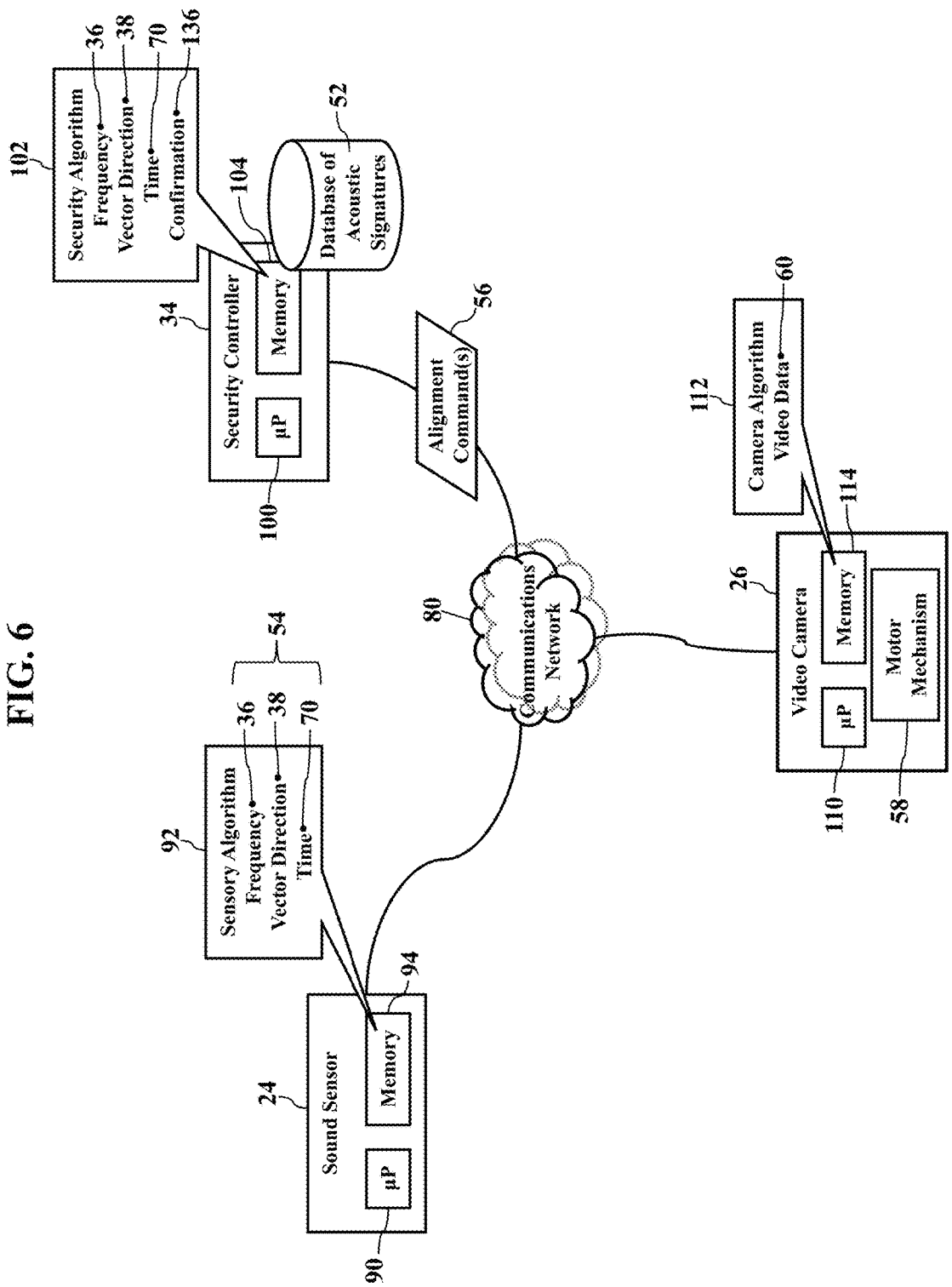

FIG. 6, though, illustrates the security event 50. If the frequency 36, the vector direction 38, and/or the time 70 fail to match the database 52 of acoustic signatures, the security algorithm 102 may instruct the processor 100 to implement a confirmation 136. That is, as the parameters 54 (representing the stimulus acoustic signal 30) are not historically logged in the database 52 of acoustic signatures, the security algorithm 102 may instruct the processor 100 to generate the alignment command 56. The processor 100 routes the alignment command 56 to a network address associated with the video camera 26. The alignment command 56 instructs the motor mechanism 58 to aim the lends of the video camera 26 to the sound source 28, as determined by the vector direction 38. The video camera 26 thus captures the video data 60 of the sound source 28.

Figure 7:
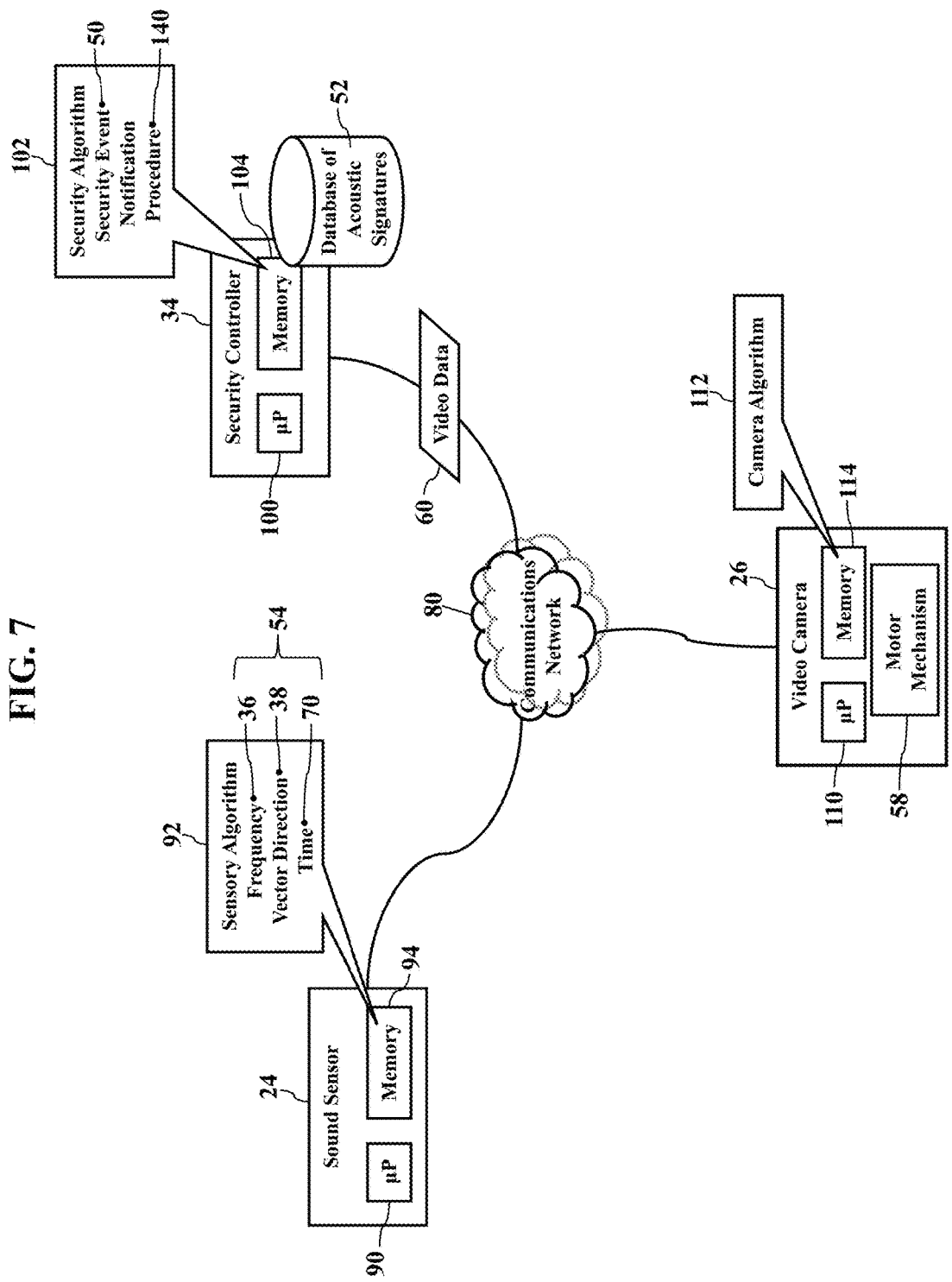

FIG. 7 illustrates local processing. As the video camera 26 captures the video data 60, its processor 110 may instruct its network interface to route the video data 60 via the communications network 80 to the security controller 34. The video data 60, for example, may route into and along a wireless or wired local area network. When the security controller 34 receives the video data 60, the security algorithm 102 may instruct the processor 100 to perform a video or image analysis. Any video or image analysis may be used to discern whether the video data 60 confirms the security event 50. If the security event 50 is genuine, the security algorithm 102 instructs the processor 100 to implement a notification procedure 140, such as summoning emergency services.

Figure 8:
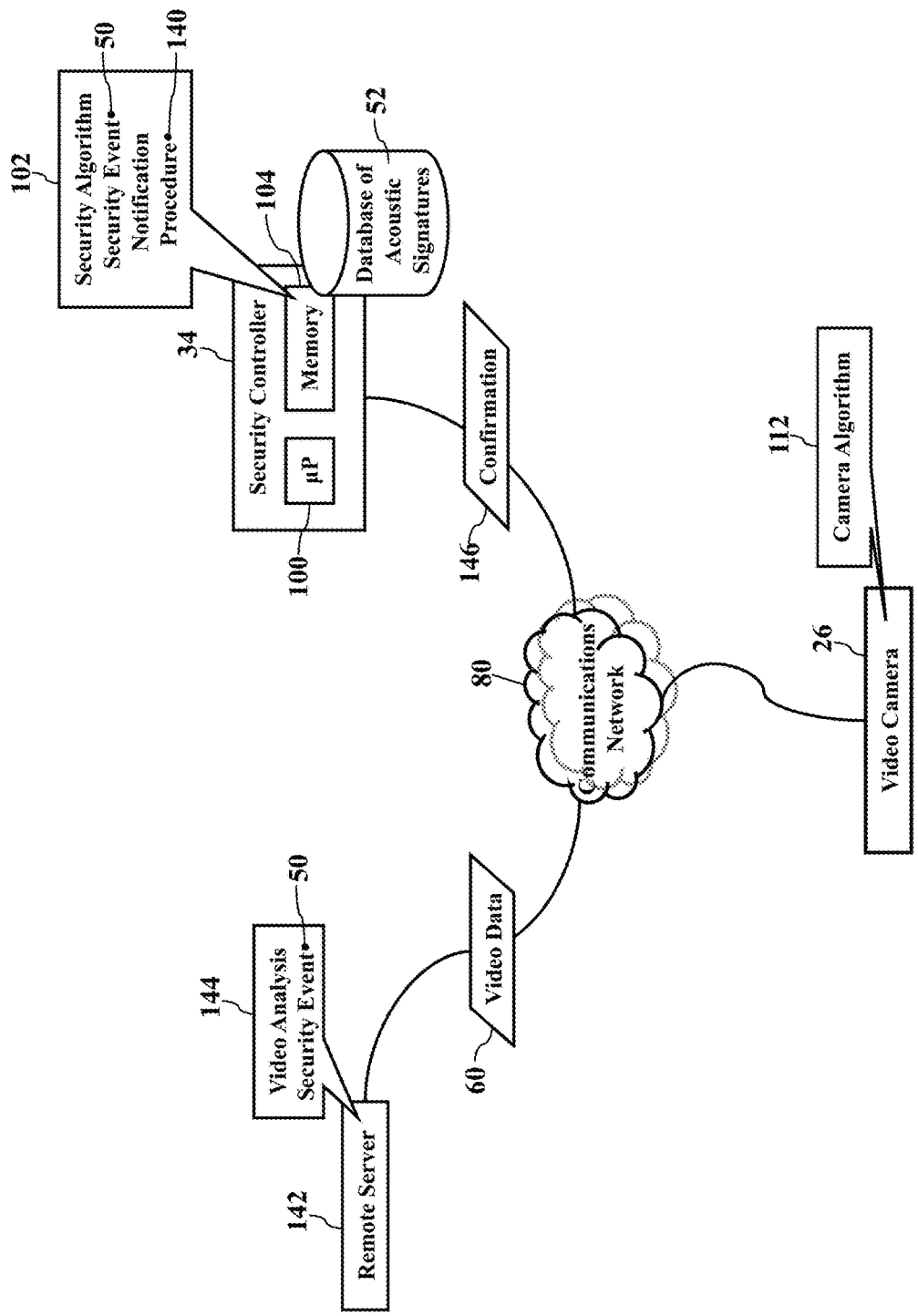

FIG. 8 illustrates remote processing. The reader may understand that any analysis of the video data 60 may be complex and cumbersome. Exemplary embodiments, then, may route the video data 60 via the communications network 80 to a remote server 142 for analysis. The remote server 142 may be configured with hardware and software capabilities for any video analysis 144 of the video data 60. Regardless, the remote server 142 analyzes the video data 60 to confirm, or deny, the security event 50. If the security event 50 is confirmed, the remote server 142 sends a confirmation message 146 to the security controller 34. The security controller 34 thus implements the notification procedure 140 to warn of the security event 50, as later paragraphs will explain.

Figure 9:
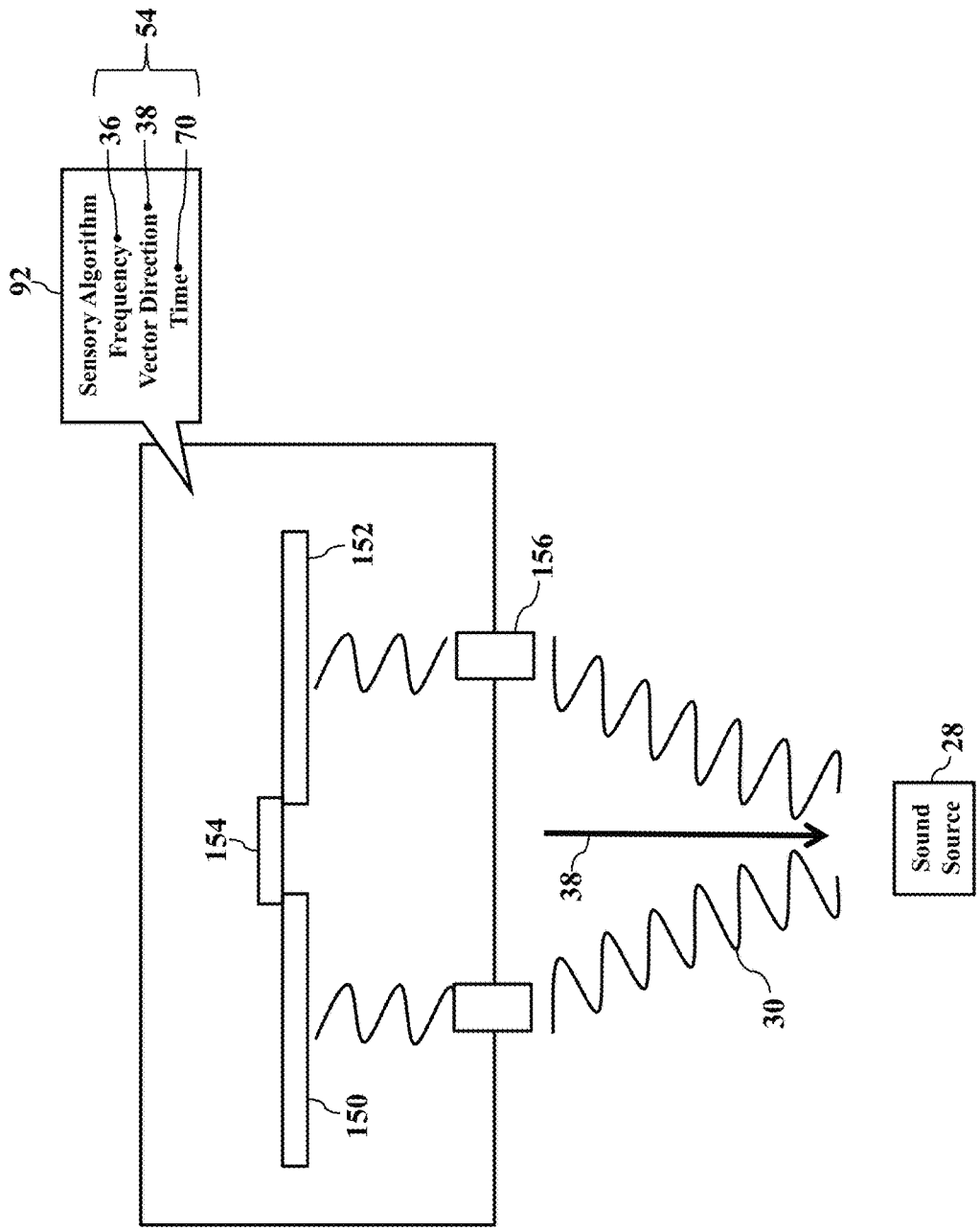
FIGS. 9-11 are illustrations of a sound sensor, according to exemplary embodiments.
Figure 10:
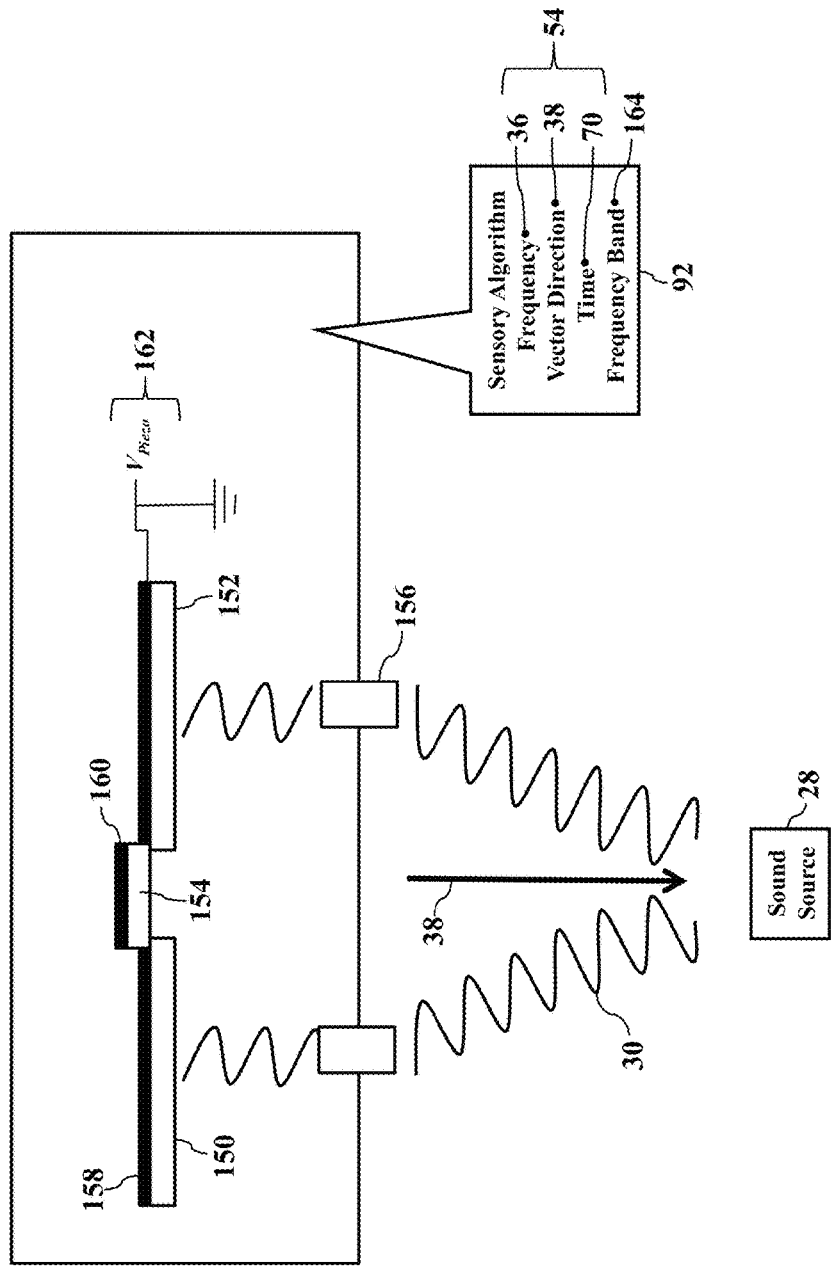
Figure 11:
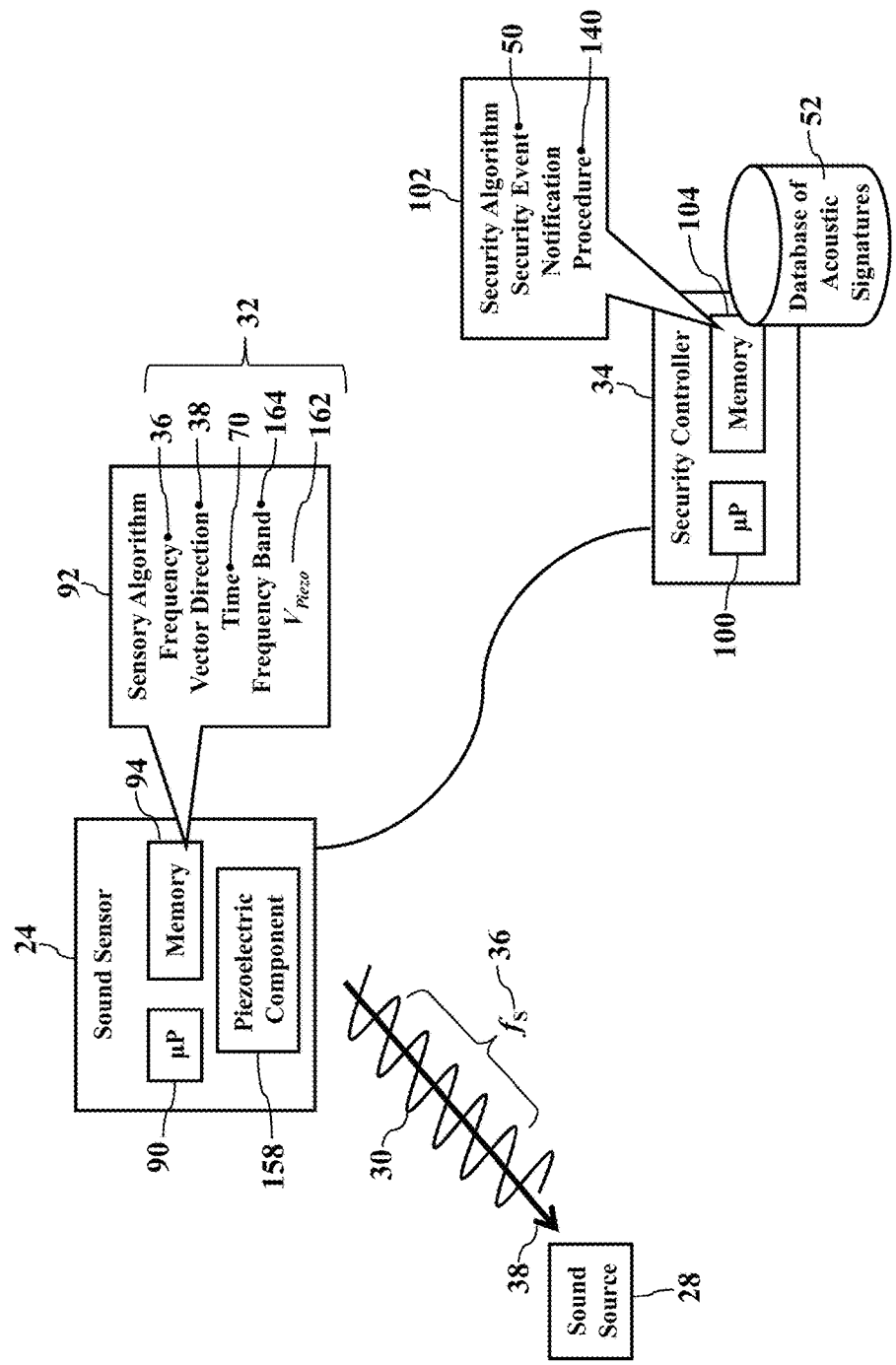

FIGS. 9-11 are illustrations of the sound sensor 24, according to exemplary embodiments. While any acoustic sensing technology may be used, FIG. 9 illustrates a physical structure based on the tympanic membranes of the *Ormia ochracea* fly. There are many patents and technical articles describing directional sound sensors based on the biological hearing structure of the *Ormia ochracea* fly, so no detailed explanation is needed. In simple words, the sound sensor 24 has two (2) or more compliant membranes 150 and 152. The compliant membranes 150 and 152 are illustrated in an enlarged view for clarity, although the physical size of the sound sensor 24 may be adapted to suit any need or response. A bridge 154 physically connects or couples the membranes 150 and 152. The stimulus acoustic signal 30 enters the sound sensor 24, perhaps propagating through one or more inlet canals 156. The stimulus acoustic signal 30 causes the membranes 150 and 152 to vibrate (due to incident acoustic pressure). The vibrations of the membranes 150 and 152 also impart a motion to the bridge 154. Research has shown that the sound sensor 24 has a rocking mode in which the membranes 150 and 152 vibrate out of phase. Research has also shown that the sound sensor 24 has a bending mode in which the membranes 150 and 152 vibrate substantially in phase. The physical properties of the membranes 150 and 152 and the bridge 154 may thus be chosen to detect the stimulus acoustic signal 30. When the stimulus acoustic signal 30 excites the sound sensor 24, the sound sensor 24 generates the outputs 32 representing the frequency 36, the vector direction 38, and/or the time 70.

FIG. 10 illustrates the piezoelectric effect. Here the sound sensor 24 may have one or more piezoelectric components 158. FIG. 10 illustrates the piezoelectric component 158 has a thin-film coating or deposition of piezoelectric material 160 on the membranes 150 and 152 and/or on the bridge 154. However, the one or more piezoelectric components 158 may have different configurations, and the piezoelectric material 160 may be applied or located to any structural component of the sound sensor 24. Regardless, when an electrical voltage $V_{Piezo}$ (illustrated as reference numeral 162) is applied to the piezoelectric component 158, the piezoelectric component 158 changes its stain properties according to the piezoelectric effect. The change in the strain properties of the piezoelectric component 158 causes a change in the vibration of the membranes 150 and 152 and/or the bridge 154. The sound sensor 24, in other words, may change its frequency response characteristics, based on the electrical voltage $V_{Piezo}$ applied to the piezoelectric component 158. The sound sensor 24 may thus be forced, or tuned, to respond to different excitation acoustic frequencies by changing the electrical voltage $V_{Piezo}$ applied to the piezoelectric component 158. For example, increasing the electrical voltage $V_{Piezo}$ may increase the strain/stiffness the piezoelectric component 158, while decreasing the electrical voltage $V_{Piezo}$ reduces the strain/stiffness. The electrical voltage $V_{Piezo}$, in other words, may determine a frequency band 164 at which the sound sensor 24 detects. So, by changing the electrical voltage $V_{Piezo}$ applied to the piezoelectric component 158, the sound sensor 24 may detect different acoustic frequencies. The electrical voltage $V_{Piezo}$ may be supplied by the internal battery (illustrated as reference numeral 98 in FIG. 4) and/or by an alternating current voltage source (perhaps using AC/DC converter).

FIG. 11 further illustrates the outputs 32. When the acoustic signal 30 stimulates the sound sensor 24, the sound sensor 24 generates the outputs 32. Because the sound sensor 24 may have the piezoelectric component 158, the sound sensor 24 may only respond if tuned to the frequency 36 of the stimulus acoustic signal 30. The electrical voltage $V_{Piezo}$ (illustrated as reference numeral 162) may thus determine the frequency band 164 at which the sound sensor 24 is sensitive. If the sound sensor 24 detects the stimulus acoustic signal 30, that detection may be dependent on the electrical voltage $V_{Piezo}$ applied to the piezoelectric component 158. So, when the sound sensor 24 generates its outputs 32, the sound sensor 24 may additionally or alternatively report or include the electrical voltage $V_{Piezo}$ applied to the piezoelectric component 158, along with the vector direction 38 of the acoustic signal 30 and the time 70.

Exemplary embodiments may thus use the piezoelectric effect as a proxy for the frequency 36. As the sound sensor 24 may ignore, or not detect, acoustic signals outside its frequency band 164, the inventors have realized that the electrical voltage $V_{Piezo}$ (applied to the piezoelectric component 158) may be used to further discern the security event 50. At a first electrical voltage $V_{Piezo}$, for example, the sound sensor 24 may detect the acoustic frequencies associated with breaking glass. At a second $V_{Piezo}$ the sound sensor 24 may detect the acoustic frequencies associated with an opening front door. A third $V_{Piezo}$ may cause the sound sensor 24 to detect the acoustic frequencies associated with an opening window. Exemplary embodiments may thus associate the electrical voltage $V_{Piezo}$ (applied to the piezoelectric component 158) as a surrogate for the frequency 36 of the stimulus acoustic signal 30.

Exemplary embodiments thus present an elegant solution. Conventional sensors based on the *Ormia ochracea* biological structure require complex and expensive schemes to determine the frequency at which the membranes 150 and 152 vibrate. Indeed, the published literature describes miniature light sources and photon detectors for determining the frequency and phase at which the membranes 150 and 152 oscillate. Exemplary embodiments, instead, may only rely on the electrical voltage $V_{Piezo}$ applied to the piezoelectric component 158. The electrical voltage $V_{Piezo}$ may be directly related to the frequency of the stimulus acoustic signal 30. No complex optical observation and measurement may be needed.

Figure 12:
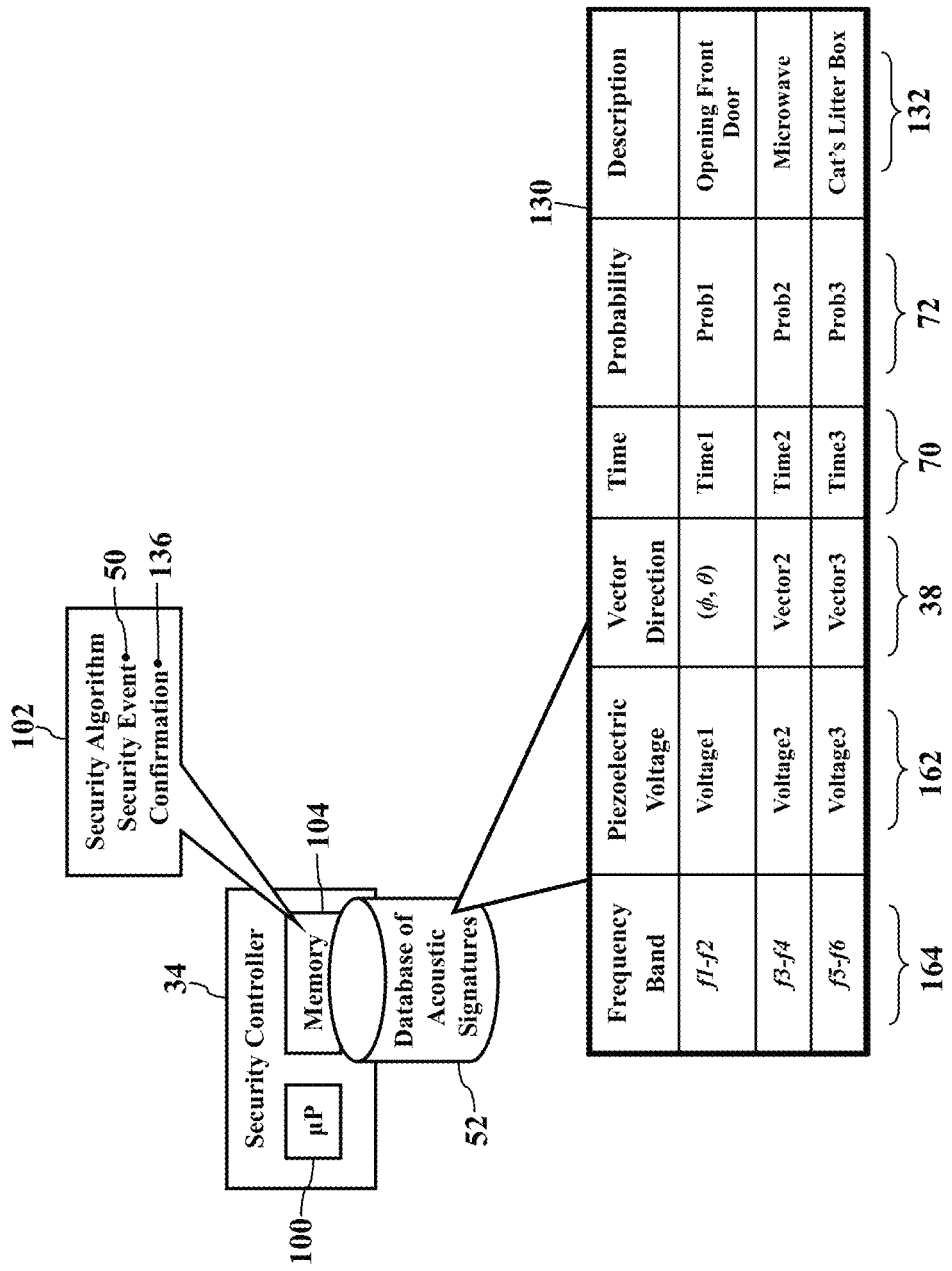
FIG. 12 is an illustration of a database of acoustic signatures, according to exemplary embodiments.

FIG. 12 is another illustration of the database 52 of acoustic signatures, according to exemplary embodiments. Here the electronic database entries in the database 52 of acoustic signatures may be defined in terms of the electrical voltage $V_{Piezo}$ (illustrated as reference numeral 162) applied to the piezoelectric component (illustrated as reference numeral 158 in FIGS. 10-11). That is, the common or known sounds within the monitoring environment may be defined in associations with the electrical voltage $V_{Piezo}$ 162, the vector direction 38, and the time 70. When the security controller 34 receives the outputs 32 from the sound sensor 24, the security controller 34 may query the database 52 of acoustic signatures for the electrical voltage $V_{Piezo}$, the vector direction 38, and/or the time 70. If the database 52 of acoustic signatures contains a matching database entry, then the stimulus acoustic signal 30 has been historically observed and thus inferred as a safe, non-threatening event. However, if no electronic database match is determined, the security controller 34 may require the confirmation 136 from the video camera 26, as earlier explained.

The electrical voltage $V_{Piezo}$ 162 thus yields the frequency band 164. Once the electrical voltage $V_{Piezo}$ is determined, the security controller 34 may query for the corresponding frequency band 164 at which the sound sensor 24 is responsive. The electrical voltage $V_{Piezo}$ 162 may thus have an electronic database association with the responsive frequency band 164 and thus the textual description 132 of the corresponding sound source. Exemplary embodiments may thus vary the electrical voltage $V_{Piezo}$ applied to the piezoelectric component (illustrated as reference numeral 158 in FIGS. 10-11) and thus vary the frequency sensitivity of the sound sensor 24. The sound sensor 24 may thus continually, randomly, or periodically vary the electrical voltage $V_{Piezo}$ and listen for, or detect, the acoustic signal 30 from different sound sources. Indeed, exemplary embodiments may ignore electrical voltages 162, and thus the frequency bands 164, that would not likely correspond to sounds in the monitored environment. For example, if the acoustic frequencies of a lawn mower are unlikely in a kitchen or basement environment, then the electrical voltage $V_{Piezo}$ need not be driven to detect the lawn mower. Likewise, if a business has no dogs or cats, then the electrical voltage $V_{Piezo}$ need not be driven to detect these pets.

Figure 13:
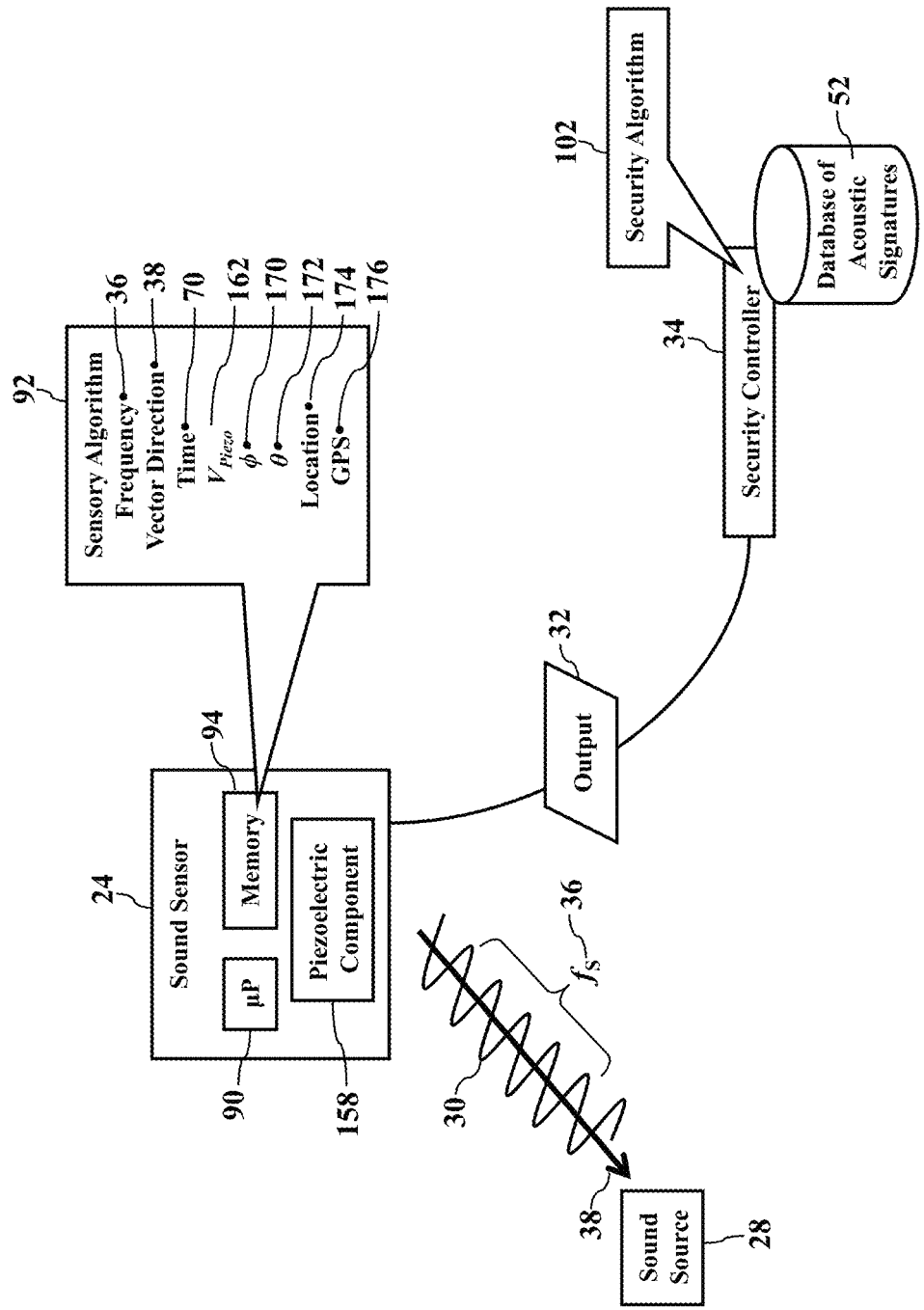
FIG. 13 is an illustration of sound localization, according to exemplary embodiments.

FIG. 13 is an illustration of sound localization, according to exemplary embodiments. When the acoustic signal 30 stimulates the sound sensor 24, the sound sensor 24 generates its outputs 32. That is, the sound sensor 24 may report the acoustic frequency 36 of the stimulus acoustic signal 30, along with the vector direction 38 and the time 70 associated with the stimulus acoustic signal 30. However, the sound sensor 24 may additionally or alternatively report the electrical voltage $V_{Piezo}$ (illustrated as reference numeral 162) applied to the piezoelectric component 158 as a proxy for the acoustic frequency 36 of the stimulus acoustic signal 30.

FIG. 13 illustrates vectorization. Here exemplary embodiments may generate the vector direction 38 of the stimulus acoustic signal 30 in three-directions or dimensions from the sound sensor 24 to the sound source 28. Conventional sensors based on the *Ormia ochracea* biological structure localize the sound source 28 and generate a turning angle $\phi$ (illustrated as reference numeral 170) and an azimuth angle $\theta$ (illustrated as reference numeral 172). That is, directional sound sensors are known that have a motorized base for localizing the sound source 28. These conventional sound sensors localize the sound source 28 by turning to the turning angle $\phi$ and orienting to the azimuth angle $\theta$.

Exemplary embodiments may thus determine the vector direction 38. As FIG. 13 illustrates, exemplary embodiments may determine the localized vector direction 38 of the sound source 28 in terms of the turning angle $\theta$ and the azimuth angle $\theta$. That is, when the sound sensor 24 generates its outputs 32, the sound sensor 24 may also report the vector direction 38 from the sound sensor 24 to the sound source 28 using the turning angle $\phi$ and the azimuth angle $\theta$. For example, exemplary embodiments may retrieve an installed location 174 of the sound sensor 24. The installed location 174 may be best represented as global positioning system information 176 describing the installed location 174 of the sound sensor 24. The global positioning system information 176 may be pre-determined and retrieved from the local memory 94, or a GPS receiver operating in the sound sensor 24 may determine the global positioning system information 176. Regardless, once the global positioning system information 176 is known, the vector direction 38 may be determined. Assuming an origin (0, 0, 0) at the installed location 174 of the sound sensor 24, the vector direction 38 orients to the turning angle ϕ and to the azimuth angle θ (assuming a spherical coordinate system). The radius R, of course, may be unknown, as the sound sensor 24 only reported the localized vector direction 38 in terms of the turning angle ϕ and the azimuth angle θ. Alternatively, any of these outputs 32 may be sent to the security controller 34 via the communications network 80, thus allowing the security algorithm 102 to retrieve the installed location 174 of the sound sensor 24 and to determine the vector direction 38 oriented to the turning angle ϕ and to the azimuth angle θ. Either solution yields three-directions of the vector direction 38 from the sound sensor 24 to the sound source 28.

Figure 14:
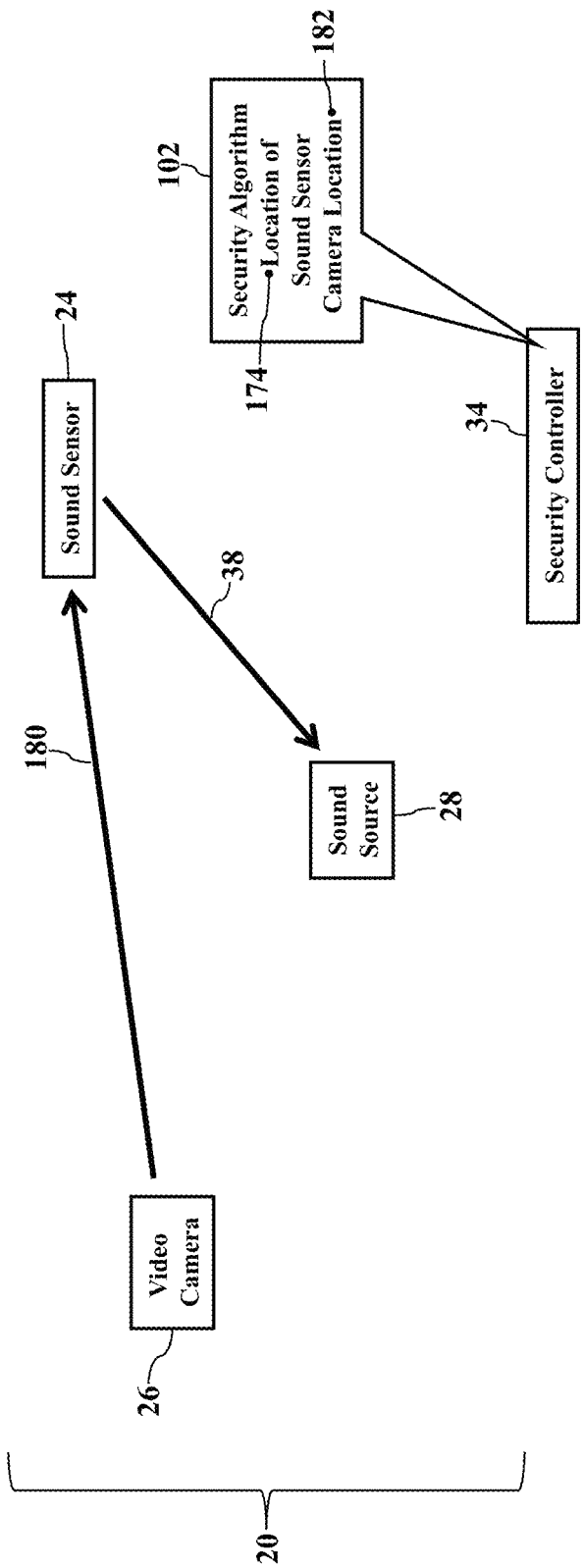
FIGS. 14-16 are illustrations of camera directionality, according to exemplary embodiments.
Figure 15:
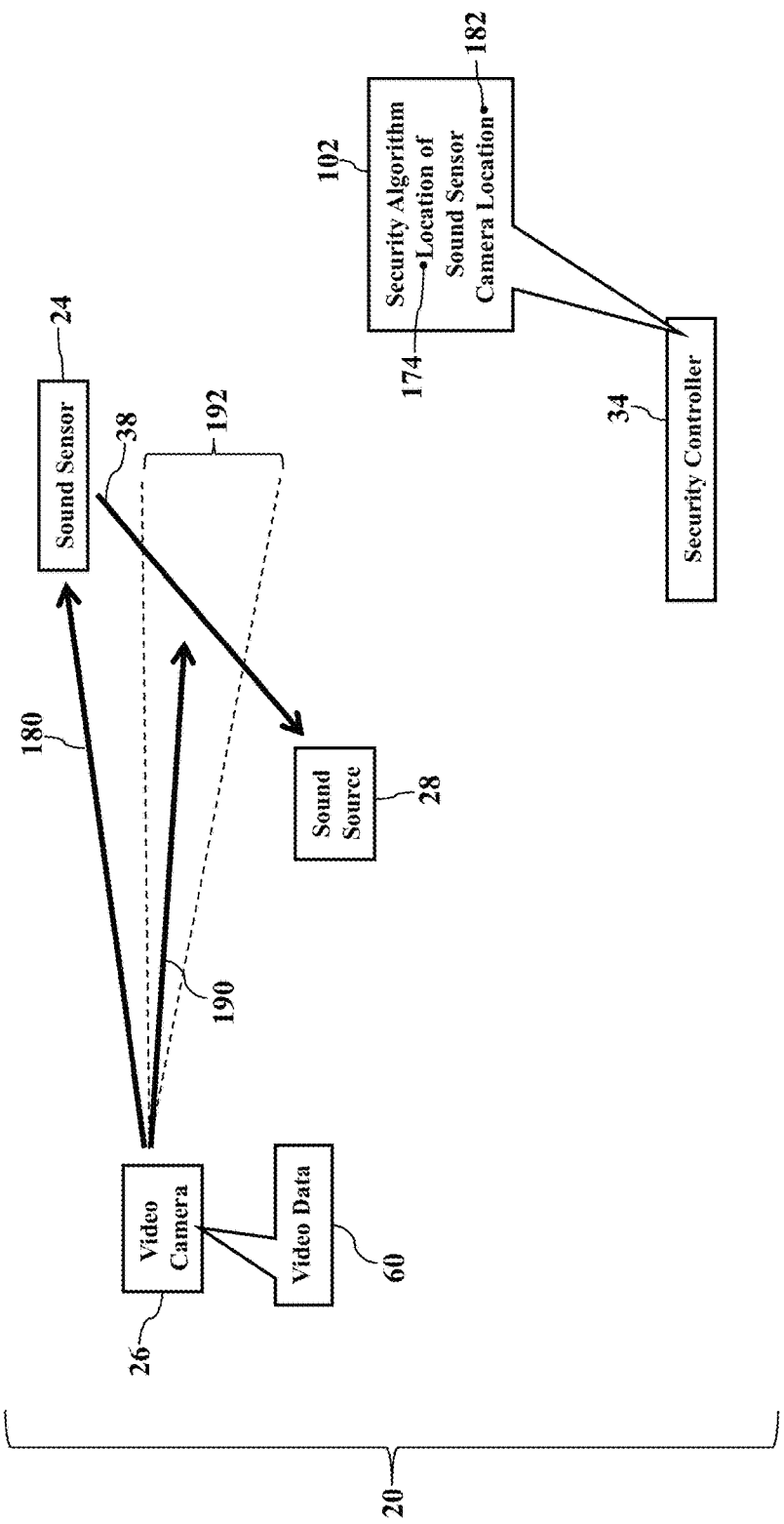
Figure 16:
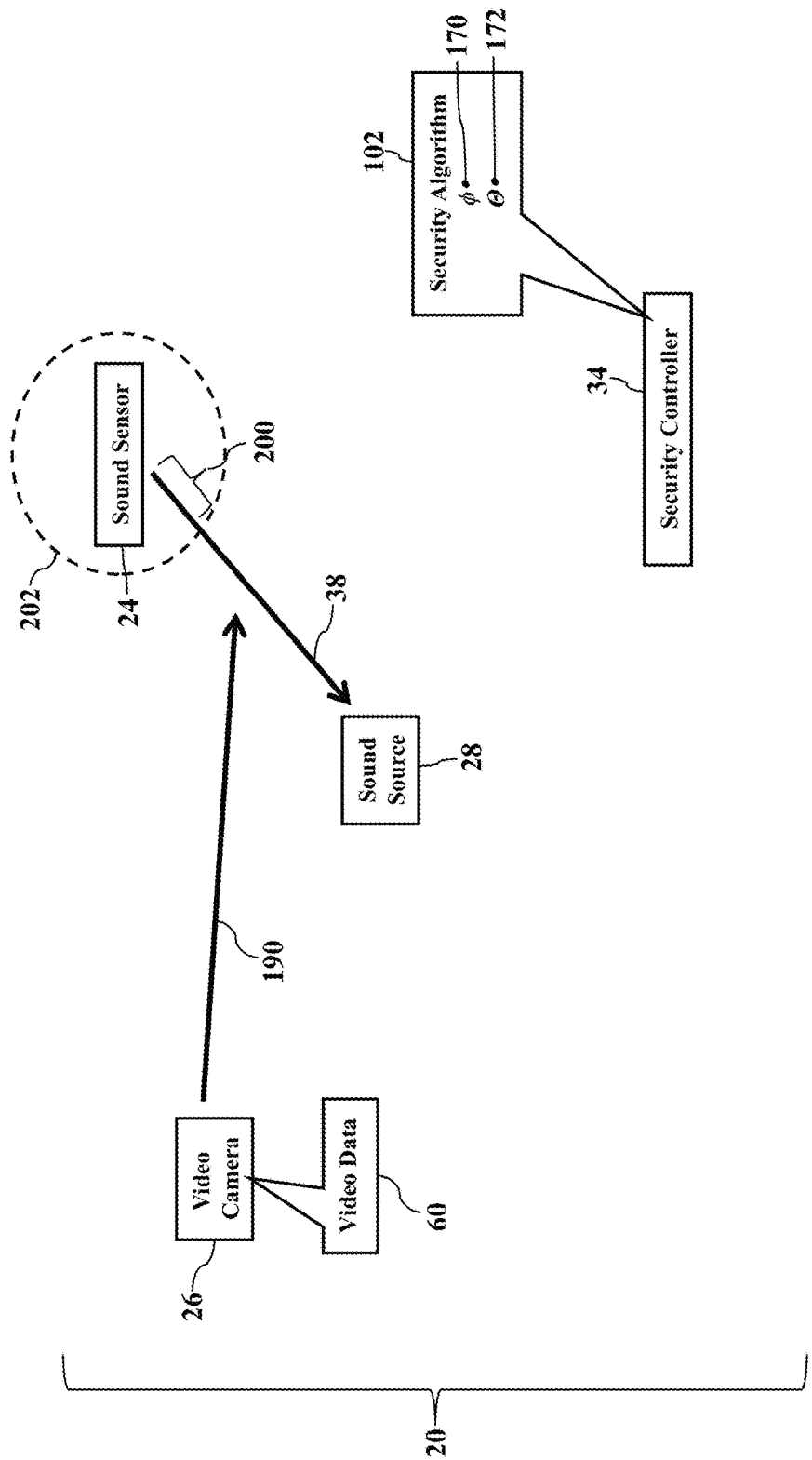

FIGS. 14-16 are illustrations of camera directionality, according to exemplary embodiments. The vector direction 38 represents a linear line to the sound source 28, as oriented from the installed location 174 of the sound sensor 24. If the video camera 26 is co-located with the sound sensor 24, then exemplary embodiments may merely co-align the lens of the video camera 26 to the vector direction 38 (perhaps using the alignment command 56, as explained with reference to FIG. 2). However, in many security installations, the video camera 26 may be a separate installation at a different location. A single video camera, for example, may tilt and pan to observe many different areas of the monitored environment. Exemplary embodiments, then, may orient the video camera 26 in relation to its actual location.

FIG. 14 illustrates a reference vector 180. Once the vector direction 38 (from the sound sensor 24 to the sound source 28) is determined, exemplary embodiments may orient the video camera 26 to the sound source 28. The security algorithm 102, for example, may first determine the reference vector 180 from the video camera 26 to the sound sensor 24. That is, the security algorithm 102 may retrieve the installed location 174 of the sound sensor 24 and the corresponding installed location 182 of the video camera 26. Once again the installed location 182 of the video camera 26 may also be represented using global positioning system information. The installed location 182 of the video camera 26 (such as global positioning system coordinates or information) may be pre-determined and locally retrieved or generated by a GPS receiver operating in the video camera 26. The security algorithm 102 may thus compare the installed location 182 of the video camera 26 to the installed location 174 of the sound sensor 24 to determine the three-dimensional reference vector 180 from the video camera 26 to the sound sensor 24. For example, coordinate differences by subtraction may yield the reference vector 180 from the video camera 26 to the sound sensor 24.

FIG. 15 illustrates a camera vector 190. The camera vector 190 represents a midpoint of a field 192 of view of the lens of the video camera 26. Once the vector direction 38 (from the sound sensor 24 to the sound source 28) is determined, and once the reference vector 180 (from the video camera 26 to the sound sensor 24) is determined, the camera vector 190 may be determined to the sound source 28. Exemplary embodiments, for example, may initially command the motor mechanism 58 to aim the video camera 26 toward the point in space representing the installed location of the sound sensor 24, as determined by the reference vector 180. Exemplary embodiments may then generate the alignment commands (to the motor mechanism 58) to trace the vector direction 38 (from the sound sensor 24 to the sound source 28) from the installed location of the video camera 26. The video camera 26, in other words, is aimed such that its field 192 of view moves or traces a path from the sound sensor 24 to the sound source 28, following the vector direction 38. The video camera 26 may thus sweep the monitoring area to capture the video data 60 toward the sound source 28.

FIG. 16 illustrates a linear exclusion 200. Here exemplary embodiments may ignore a spherical zone 202 about the sound sensor 24. Even though the three-dimensional vector direction 38 (from the sound sensor 24 to the sound source 28) may be generally known, the distance or length of the vector direction 38 is unknown. That is, the turning angle θ 172 and the azimuth angle θ 174 may be known, but the radius R (in spherical coordinates) may be unknown. Precious seconds may thus be wasted sweeping the video camera 26 along the vector direction 38 toward the sound source 28. Exemplary embodiments, then, may assume that the sound source 28 is some feet or yards away from the sound sensor 24. For example, if the sound sensor 24 is installed in a ceiling corner of a room, one may assume that the sound source 28 is more than three (3) or even five (5) feet from the sound sensor 24. Exemplary embodiments may thus disregard the spherical zone 202 about the video camera 26, assuming the sound source 28 will rarely, if ever, be physically located within such a short distance. Exemplary embodiments may then generate the alignment commands (illustrated as reference numeral to the motor mechanism 58) to start tracing the vector direction 38 (from the sound sensor 24 to the sound source 28) from the spherical zone 202 about the video camera 26. The spherical zone 202 may be defined by adding a predefined spherical radius to the GPS information describing the installed location of the sound sensor 24. The video camera 26, in other words, begins capturing the video data 60 at or outside the spherical zone 202. The video camera 26 may thus sweep the monitoring area beginning from the spherical zone 202 about its installed location 174. Exemplary embodiments may ignore the first or initial several feet along the vector direction 38 from the sound sensor 24, thus saving precious seconds in emergency situations.

Figure 17:
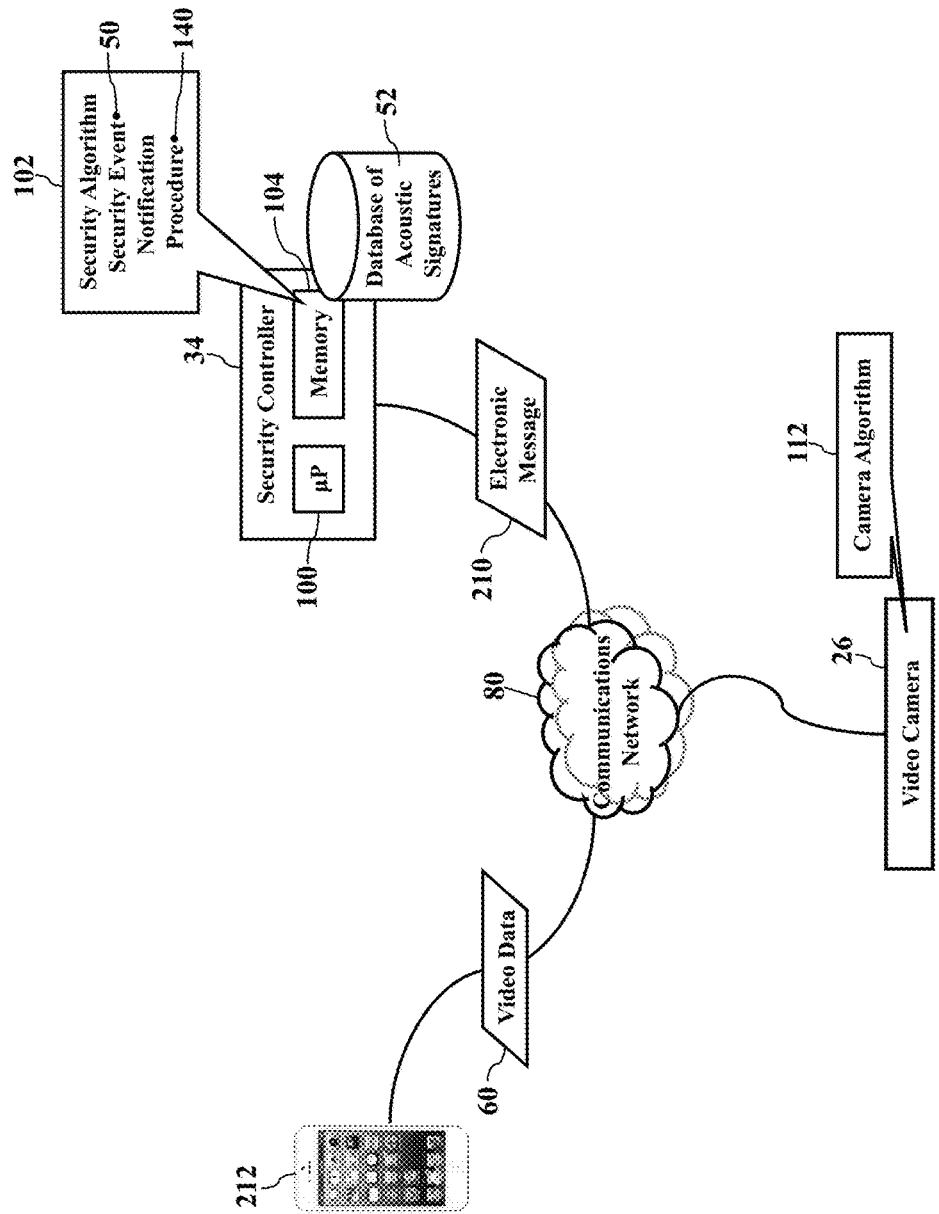
FIGS. 17-18 are illustrations of security notifications, according to exemplary embodiments.
Figure 18:
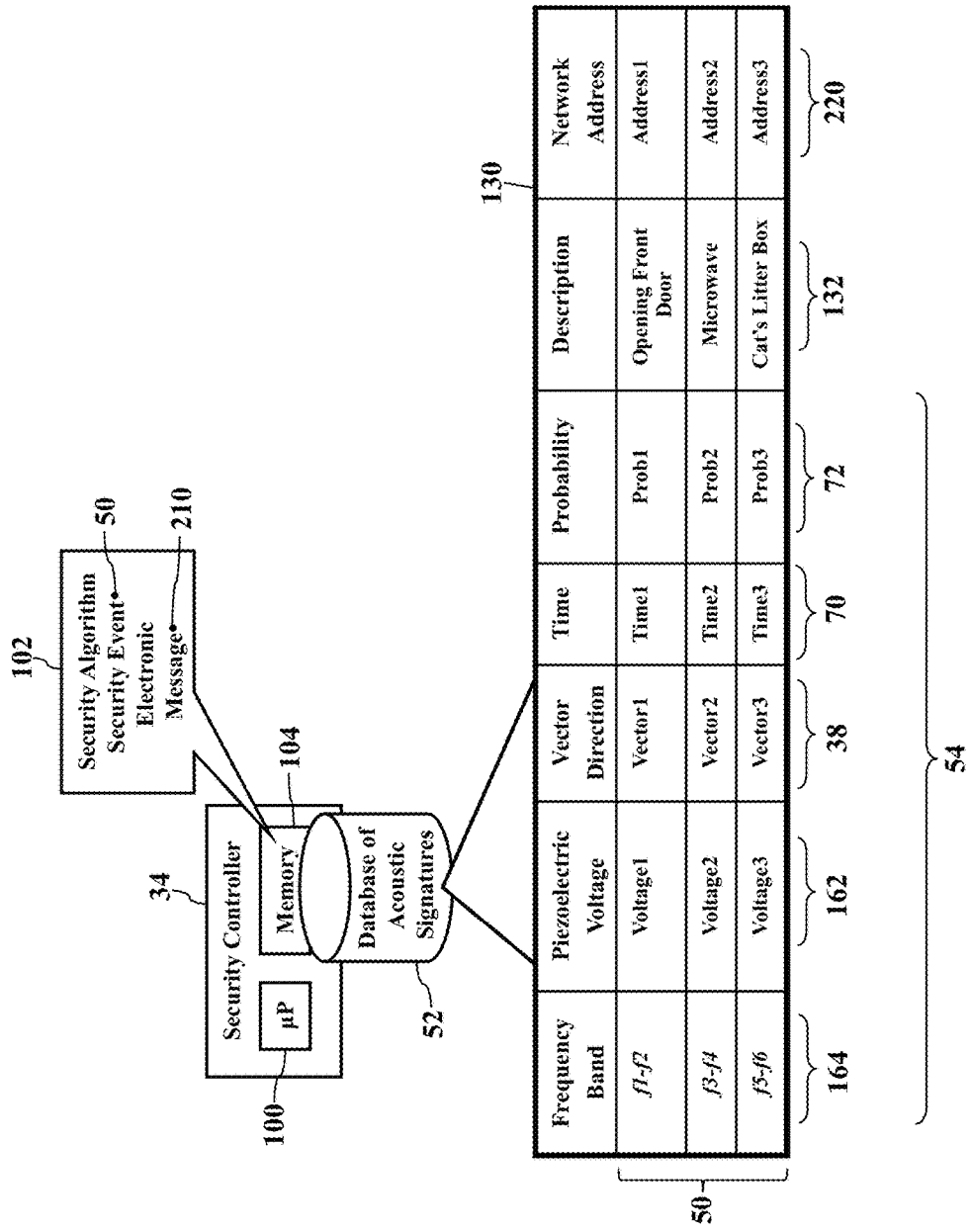

FIGS. 17-18 illustrate notifications, according to exemplary embodiments. As the reader may understand, when the security controller 34 confirms the security event 50, electronic notifications may be sent. FIG. 17, for example, illustrates an electronic message 210. The electronic message 210 may be a text message, electronic mail message, social network posting, voice-over Internet Protocol call, website announcement, and/or any other electronic notification. Exemplary embodiments may even initiate or dial a plain old telephone call. Regardless, the electronic message 210 is sent, addressed, and/or routed to one or more notification addresses, such as Internet Protocol addresses, email addresses, domain names, or telephone numbers. Regardless, the electronic message 210 may include electronic and/or textual information describing the security event 50 determined by the security controller 34. Exemplary embodiments may even send the video data 60 captured by the video camera 26, thus allowing a remote device (such as a user's smartphone 212) to process the video data 60 for display. A user may thus view a real time video feed of the security event 50.

FIG. 18 further illustrates the database 52 of acoustic signatures. Here the database 52 of acoustic signatures may include entries for different notification addresses 220. When the security controller 34 generates the electronic message 210, the security controller 34 may consult the database 52 of notification addresses for the notification address 220. The database 52 of acoustic signatures, in other words, may also include electronic database associations with different notification addresses 220 for different parameters 54 of the corresponding stimulus acoustic signal 30. For example, a notification address 220 may be associated with a particular electrical voltage $V_{Piezo}$ applied to the piezoelectric component 158 of the sound sensor 24 (as explained with reference to FIGS. 10-13). Whenever the electrical voltage $V_{Piezo}$ matches an entry in the database 52 of acoustic signatures, the security controller 34 may retrieve the corresponding notification address 220. If the electrical voltage $V_{Piezo}$ corresponds to the frequencies of breaking glass, the user likely wants notification. Likewise, if the vector direction 38 matches an entry in the database 52 of acoustic signatures, the security controller 34 may retrieve the corresponding notification address 220. The security algorithm 102 may thus be configured to notify of any output generated by the sound sensor 24, whether or not the security event 50 is determined. Of course most users will not want such frequent notifications, hence most users will configure the security algorithm 102 to only notify of genuine security events warranting concern.

Figure 19:
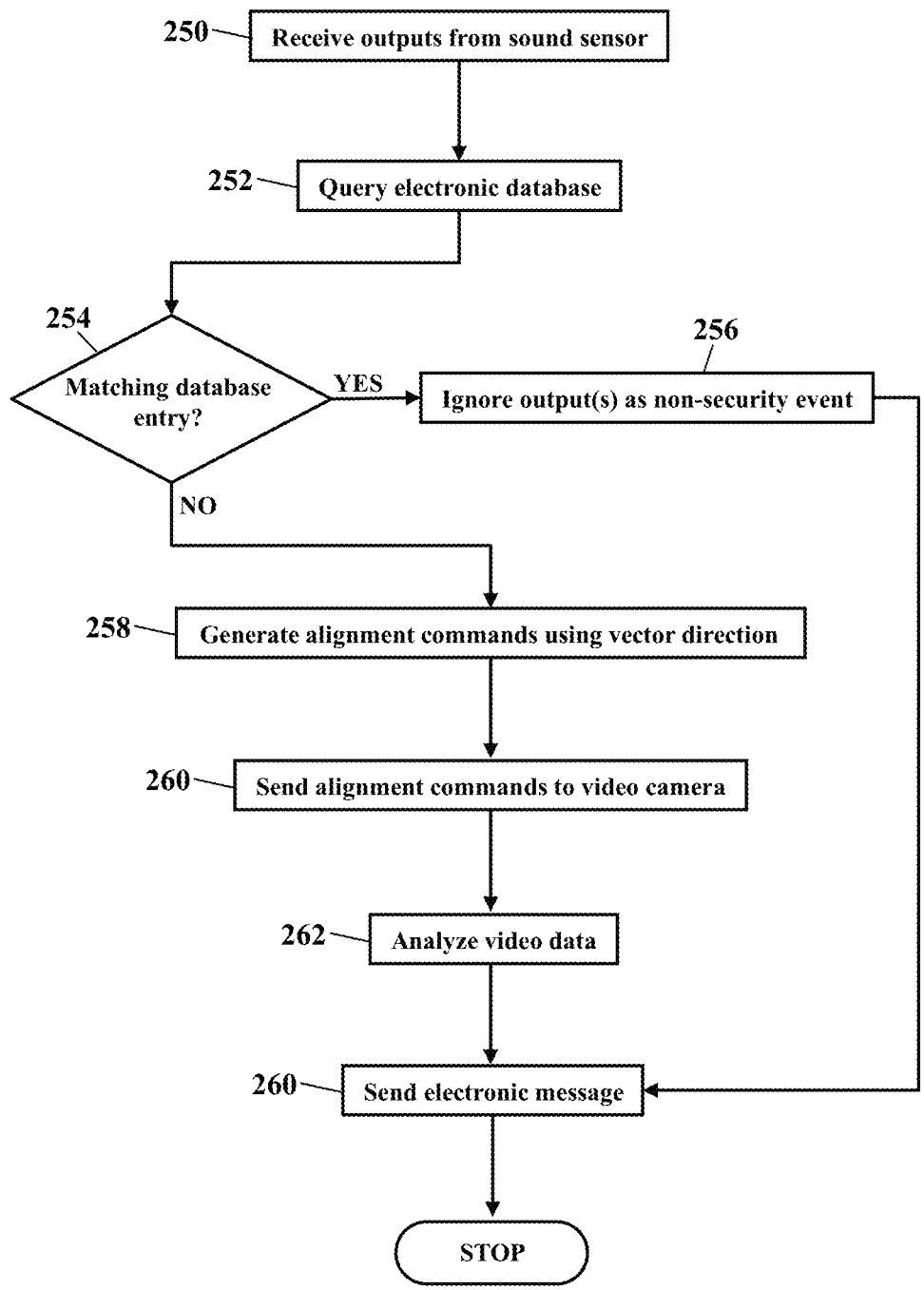
FIG. 19 is a flowchart illustrating a method or algorithm for directional location of security concerns, according to exemplary embodiments.

FIG. 19 is a flowchart illustrating a method or algorithm for directional location of security concerns, according to exemplary embodiments. One or more outputs, generated by a sound sensor of a security system, are received (Block 250). An electronic database is queried for any of the outputs (Block 252). If a matching entry is determined (Block 254), the output may be ignored as historically observed (Block 256). However, if the output(s) do not match an entry (Block 254, the alignment commands 56 are generated using the vector direction 38 (Block 258) and sent to the video camera 26 (Block 260). The video data 60 is analyzed to confirm or deny the security event 50 (Block 262). The electronic message 210 is sent as a notification (Block 264).

Figure 20:
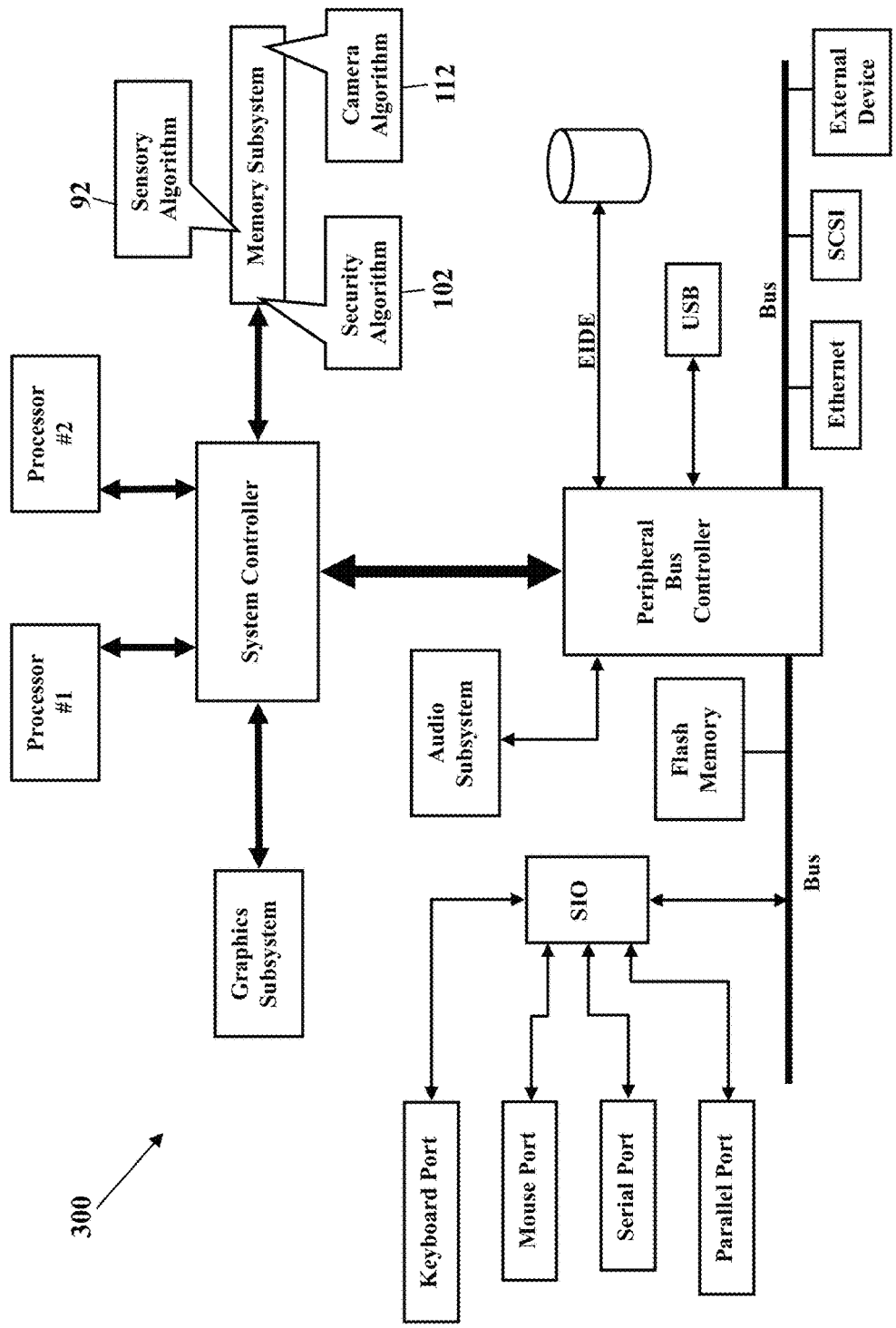
FIGS. 20-25 depict still more operating environments for additional aspects of the exemplary embodiments.

FIG. 20 is a schematic illustrating still more exemplary embodiments. FIG. 20 is a more detailed diagram illustrating a processor-controlled device 300. As earlier paragraphs explained, exemplary embodiments may partially or entirely operate in any mobile or stationary processor-controlled device. FIG. 20, then, illustrates the sensory algorithm 92, the security algorithm 102, and the camera algorithm 112 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Figure 21:
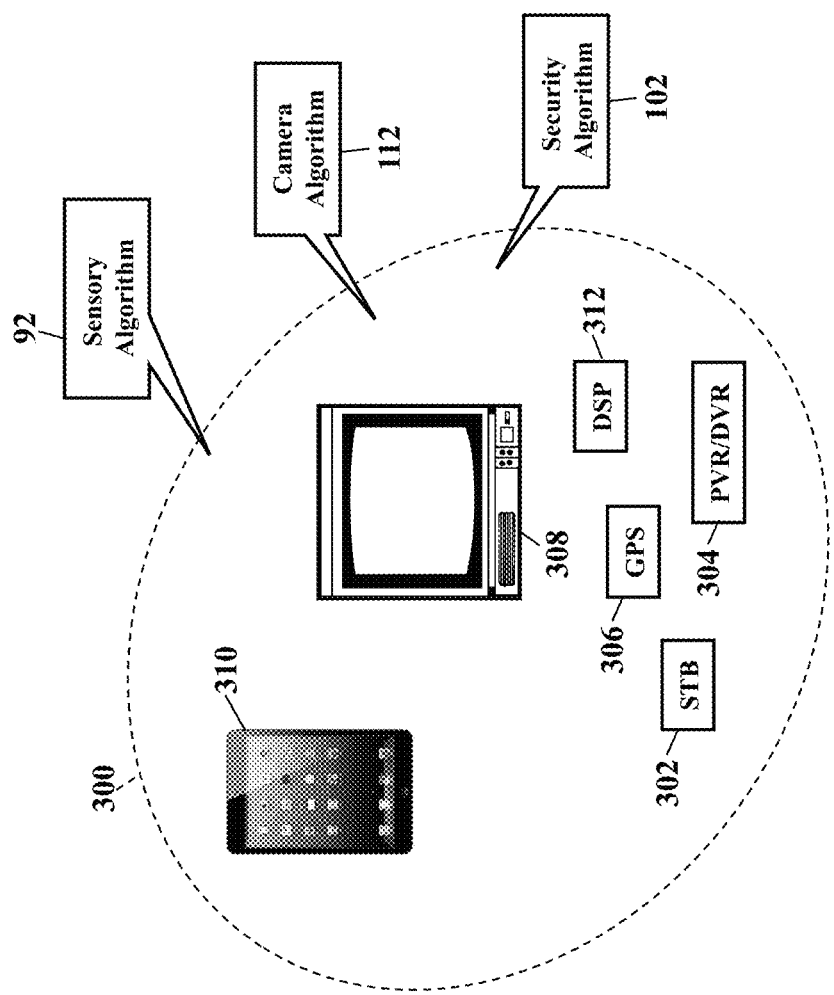

FIG. 21 depicts other possible operating environments for additional aspects of the exemplary embodiments. FIG. 21 illustrates the sensory algorithm 92, the security algorithm 102, and the camera algorithm 112 operating within various other processor-controlled devices 300. FIG. 21, for example, illustrates a set-top box ("STB") (302), a personal/digital video recorder (PVR/DVR) 304, a Global Positioning System (GPS) device 306, an interactive television 308, a tablet computer 310, or any computer system, communications device, or processor-controlled device utilizing the processor and/or a digital signal processor (DP/DSP) 312. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described.

Figure 22:
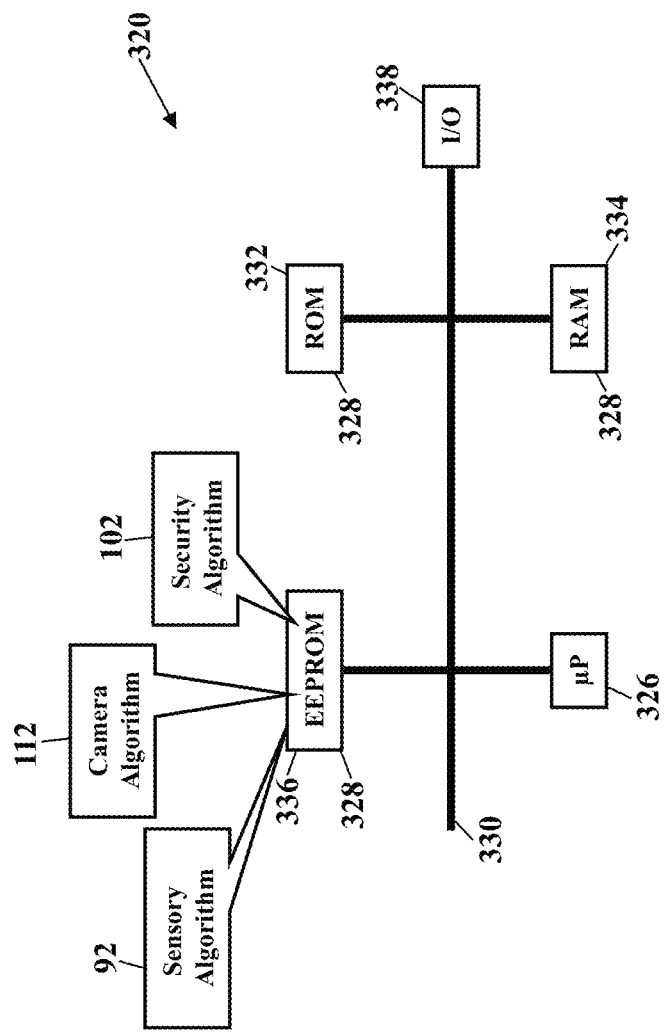
Figure 24:
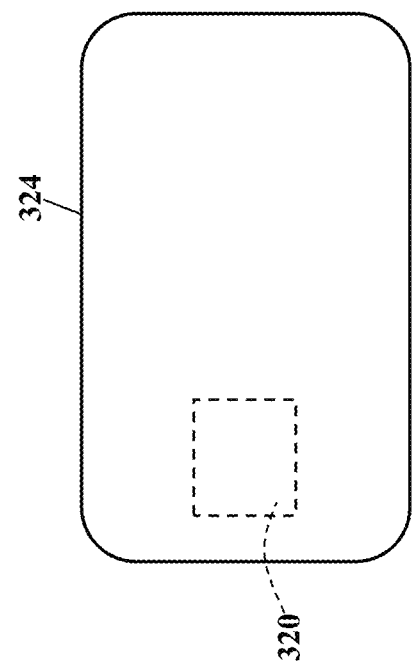
Figure 23:
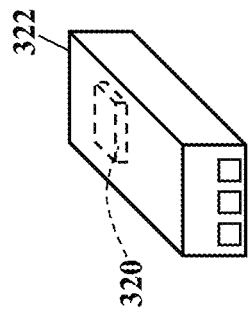

FIGS. 22-24 are schematics further illustrating the processor-controlled device 300, according to exemplary embodiments. FIG. 22 is a block diagram of a Subscriber Identity Module 320, while FIGS. 23 and 24 illustrate, respectively, the Subscriber Identity Module 320 embodied in a plug 322 and in a card 324. As those of ordinary skill in the art recognize, the Subscriber Identity Module 320 may be used in conjunction with many devices (such as the sound sensor 24, the camera 26, the security controller 34, the smartphone 212, and the processor-controlled device 300). The Subscriber Identity Module 320 stores user information (such as a user's International Mobile Subscriber Identity, the user's $K_i$ number, and other user information) and any portion of the sensory algorithm 92, the security algorithm 102, and the camera algorithm 112. As those of ordinary skill in the art also recognize, the plug 322 and the card 324 each may interface with any mobile or stationary device.

FIG. 22 is a block diagram of the Subscriber Identity Module 320, whether embodied as the plug 322 of FIG. 23 or as the card 324 of FIG. 24. Here the Subscriber Identity Module 320 comprises a microprocessor 326 (μP) communicating with memory modules 328 via a data bus 330. The memory modules 328 may include Read Only Memory (ROM) 332, Random Access Memory (RAM) and or flash memory 334, and Electrically Erasable-Programmable Read Only Memory (EEPROM) 336. The Subscriber Identity Module 320 stores some or all of the sensory algorithm 92, the security algorithm 102, and/or the camera algorithm 112 in one or more of the memory modules 328. An Input/Output module 338 handles communication between the Subscriber Identity Module 320 and a host device. Because Subscriber Identity Modules are well known in the art, this patent will not further discuss the operation and the physical/memory structure of the Subscriber Identity Module 320.

Figure 25:
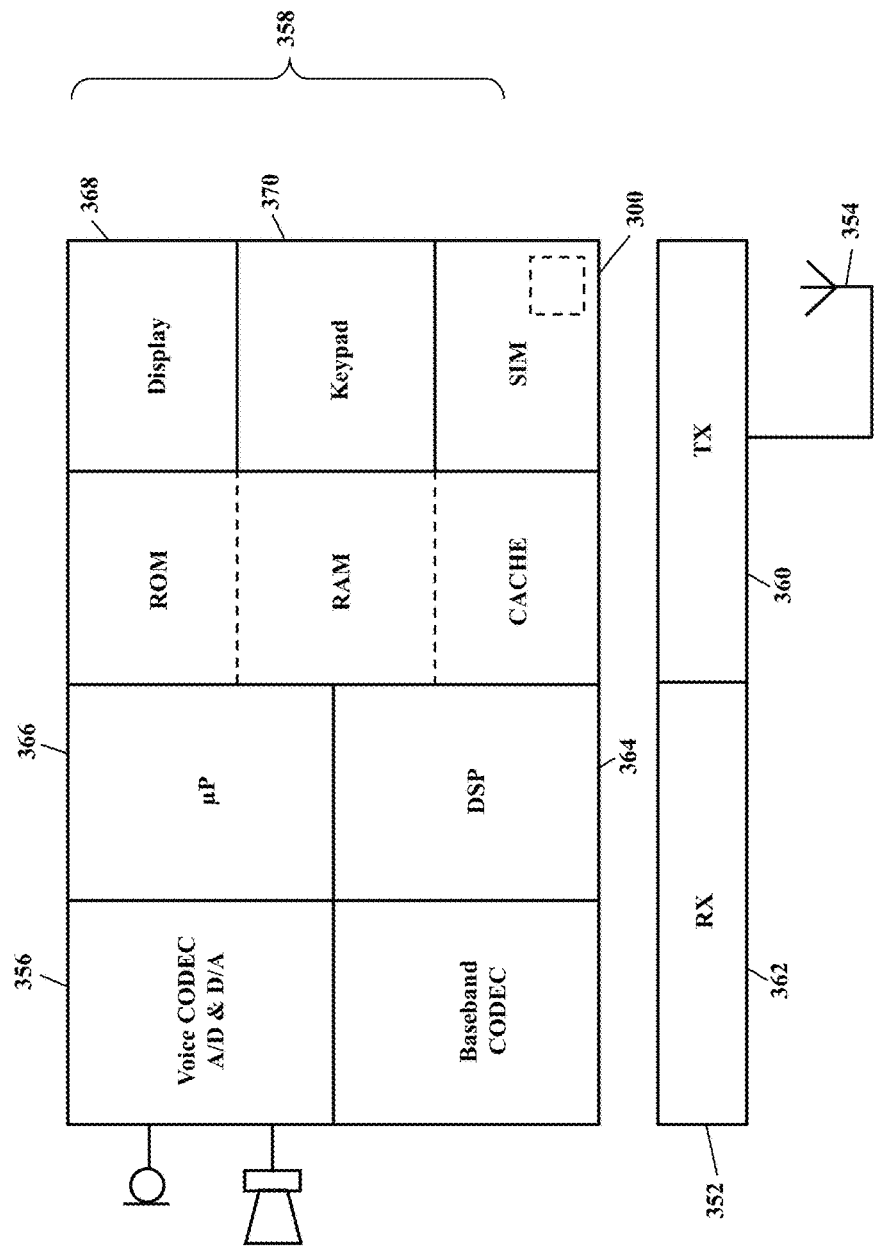

FIG. 25 is a schematic further illustrating the operating environment, according to exemplary embodiments. FIG. 25 is a block diagram illustrating more possible componentry of the sound sensor 24, the camera 26, the security controller 34, the smartphone 212, and the processor-controlled device 300. The componentry may include one or more radio transceiver units 352, an antenna 354, a digital baseband chipset 356, and a man/machine interface (MMI) 358. The transceiver unit 352 includes transmitter circuitry 360 and receiver circuitry 362 for receiving and transmitting radio-frequency (RF) signals. The transceiver unit 352 couples to the antenna 354 for converting electrical current to and from electromagnetic waves. The digital baseband chipset 356 contains a digital signal processor (DSP) 364 and performs signal processing functions for audio (voice) signals and RF signals. As FIG. 25 shows, the digital baseband chipset 356 may also include an on-board microprocessor 366 that interacts with the man/machine interface (MMI) 358. The man/machine interface (MMI) 358 may comprise a display device 368, a keypad 370, and the Subscriber Identity Module 320. The on-board microprocessor 366 may also interface with the Subscriber Identity Module 320.

Exemplary embodiments may be applied to any signaling standard. As those of ordinary skill in the art recognize, FIGS. 20-25 may illustrate a Global System for Mobile (GSM) communications device. That is, the communications device may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for locational determination of security concerns, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a controller of a security system, an output generated by a sound sensor;
determining, by the controller of the security system, that a direction based on the output generated by the sound sensor is unknown; and
generating, by the controller of the security system, a security event in response to the direction being unknown.

2. The method of claim 1, further comprising determining the direction to a sound source that stimulates the sound sensor to generate the output.

3. The method of claim 2, further comprising sending a command to a camera, the command instructing the camera to align to the direction to the sound source.

4. The method of claim 1, further comprising determining a database lacks an entry for the direction based on the output generated by the sound sensor.

5. The method of claim 1, further comprising receiving video data from a video camera.

6. The method of claim 1, further comprising determining a time associated with the output generated by the sound sensor.

7. The method of claim 1, further comprising sending a message that notifies of the security event.

8. A system, comprising:
a hardware processor; and
a memory device, the memory device storing instructions, the instructions when executed causing the hardware processor to perform operations, the operations comprising:
receiving an output generated by a sound sensor of a security system;
determining that a direction based on the output generated by the sound sensor is unknown; and
generating a security event in response to the direction based on the output generated by the sound sensor being unknown.

9. The system of claim 8, wherein the operations further comprise determining the direction to a sound source that stimulates the sound sensor to generate the output.

10. The system of claim 9, wherein the operations further comprise sending a command to a camera, the command instructing the camera to align to the direction to the sound source.

11. The system of claim 8, wherein the operations further comprise determining a database lacks an entry for the direction based on the output generated by the sound sensor.

12. The system of claim 8, wherein the operations further comprise receiving video data from a video camera.

13. The system of claim 8, wherein the operations further comprise determining a time associated with the output generated by the sound sensor.

14. The system of claim 8, wherein the operations further comprise sending a message that notifies of the security event.

15. A memory device storing instructions that when executed cause a hardware processor to perform operations, the operations comprising:
receiving an output generated by a sound sensor of a security system;
determining that a direction based on the output generated by the sound sensor is unknown; and
generating a security event in response to the direction based on the output generated by the sound sensor being unknown.

16. The memory device of claim 15, wherein the operations further comprise determining the direction to a sound source that stimulates the sound sensor to generate the output.

17. The memory device of claim 16, wherein the operations further comprise sending a command to a camera, the command instructing the camera to align to the direction to the sound source.

18. The memory device of claim 15, wherein the operations further comprise determining a database lacks an entry for the direction based on the output generated by the sound sensor.

19. The memory device of claim 15, wherein the operations further comprise receiving video data from a video camera.

20. The memory device of claim 15, wherein the operations further comprise determining a time associated with the output generated by the sound sensor.

* * * * *